United States Patent
Budagavi et al.

(10) Patent No.: US 9,693,070 B2
(45) Date of Patent: Jun. 27, 2017

(54) LUMA-BASED CHROMA INTRA-PREDICTION FOR VIDEO CODING

(75) Inventors: Madhukar Budagavi, Plano, TX (US); Akira Osamoto, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 580 days.

(21) Appl. No.: 13/532,556

(22) Filed: Jun. 25, 2012

(65) Prior Publication Data

US 2012/0328013 A1    Dec. 27, 2012

Related U.S. Application Data

(60) Provisional application No. 61/501,031, filed on Jun. 24, 2011.

(51) Int. Cl.
| | |
|---|---|
| *H04N 7/26* | (2006.01) |
| *H04N 19/186* | (2014.01) |
| *H04N 19/105* | (2014.01) |
| *H04N 19/96* | (2014.01) |

(52) U.S. Cl.
CPC ......... *H04N 19/186* (2014.11); *H04N 19/105* (2014.11); *H04N 19/96* (2014.11)

(58) Field of Classification Search
CPC ....................................................... H04N 7/26
USPC .................................................... 375/240.12
See application file for complete search history.

(56) References Cited

U.S. PATENT DOCUMENTS

| | | |
|---|---|---|
| 2011/0255591 A1 | 10/2011 | Kim et al. |
| 2011/0317757 A1* | 12/2011 | Coban et al. ............ 375/240.02 |

FOREIGN PATENT DOCUMENTS

| | | |
|---|---|---|
| WO | WO 2012/175003 | * 12/2012 |

OTHER PUBLICATIONS

U.S. Appl. No. 61/498,265, filed Jun. 2011, Huang et al.*

(Continued)

*Primary Examiner* — Frederick Bailey
(74) *Attorney, Agent, or Firm* — Gregory J. Albin; Charles A. Brill; Frank D. Cimino

(57) ABSTRACT

A method for luma-based chroma intra-prediction in a video encoder or a video decoder is provided that includes down sampling a first reconstructed luma block of a largest coding unit (LCU), computing parameters $\alpha$ and $\beta$ of a linear model using immediate top neighboring reconstructed luma samples and left neighboring reconstructed luma samples of the first reconstructed luma block and reconstructed neighboring chroma samples of a chroma block corresponding to the first reconstructed luma block, wherein the linear model is $Pred_C[x,y]=\alpha \cdot Rec_L'[x,y]+\beta$, wherein x and y are sample coordinates, $Pred_C$ is predicted chroma samples, and $Rec_L'$ is samples of the down sampled first reconstructed luma block, and wherein the immediate top neighboring reconstructed luma samples are the only top neighboring reconstructed luma samples used, and computing samples of a first predicted chroma block from corresponding samples of the down sampled first reconstructed luma block using the linear model and the parameters.

18 Claims, 12 Drawing Sheets

(56) References Cited

OTHER PUBLICATIONS

Jianle Chen et al, "CE6.a.4: Chroma Intra Prediction by Reconstructed Luma Samples", JCTVC-E266, Mar. 16-23, 2011, pp. 1-10, Joint Collaborative Team on Video Coding (JCT-VC) of ITU-T SG16 WP3 and ISO/IEC JTC1/SC29/WG11, Geneva, Switzerland.

Jianle Chen et al, "CE6.a: Chroma Intra Prediction by Reconstructed Luma Samples", JCTVC-D350, Jan. 20-28, 2011, pp. 1-7, Joint Collaborative Team on Video Coding (JCT-VC) of ITU-T SG16 WP3 and ISO/IEC JTC1/SC29/WG11, Daegu, Korea.

Jianle Chen and Vadim Seregin, "Chroma Intra Prediction by Reconstructed Luma Samples", JCTVC-C206, Oct. 7-15, 2010, pp. 1-7, Joint Collaborative Team on Video Coding (JCT-VC) of ITU-T SG16 WP3 and ISO/IEC JTC1/SC29/WG11, Guangzhou, China.

Jangsun Kim et al, "New Intra Chroma Intra Prediction Using Inter-Channel Correlation", JCTVC-B021, Jul. 21-28, 2010, pp. 1-9, Joint Collaborative Team on Video Coding (JCT-VC) of ITU-T SG16 WP3 and ISO/IEC JTC1/SC29/WG11, Geneva, Switzerland.

Thomas Wiegand et al, "WD3: Working Draft 3 of High-Efficiency Video Coding", JCTVC-E603, Mar. 16-23, 2011, pp. 1-215, Joint Collaborative Team on Video Coding (JCT-VC) of ITU-T SG16 WP3 and ISO/IEC JTC1/SC29/WG11, Geneva, Switzerland.

Benjamin Bross et al, "High efficiency video coding (HEVC) text specification draft 7", JCTVC-I1003_d4, Apr. 27-May 7, 2012, pp. 1-297, Joint Collaborative Team on Video Coding (JCT-VC) of ITU-T SG16 WP3 and ISO/IEC JTC1/SC29/WG11, Geneva, Switzerland.

Madhukar Budagavi and Akira Osamoto, "Luma-Based Chroma Intra Prediction Simplification", JCTVC-F233, Jul. 14-22, 2011, pp. 1-5, Joint Collaborative Team on Video Coding (JCT-VC) of ITU-T SG16 WP3 and ISO/IEC JTC1/SC29/WG11, Torino, Italy.

Gisle Bjontegaard, "Calculation of Average PSNR Differences Between RD-Curves", VCEG-M33, Apr. 2-4, 2001, pp. 1-4, ITU-Telecommunications Standardization Sector, Study Group 16, Question 6, Video Coding Experts Group (VCEG), Austin, Texas.

\* cited by examiner

LUMA-BASED CHROMA INTRA-PREDICTION FOR VIDEO CODING

CROSS-REFERENCE TO RELATED APPLICATIONS

This application claims benefit of U.S. Provisional Patent Application Ser. No. 61/501,031, filed Jun. 24, 2011, which is incorporated herein by reference in its entirety. This application is related to co-pending U.S. patent application Ser. No. 13/470,186, filed May 11, 2012, which is incorporated herein by reference in its entirety.

BACKGROUND OF THE INVENTION

Field of the Invention

Embodiments of the present invention generally relate to luma-based chroma intra-prediction in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. To address these requirements, HEVC utilizes larger block sizes than H.264/AVC. In HEVC, the largest coding unit (LCU) can be up to 64×64 in size, while in H.264/AVC, the macroblock size is fixed at 16×16.

Several coding efficiency enhancement tools are proposed in HEVC to reduce coding overhead. One such coding tool is luma-based chroma intra-prediction, also referred to as linear method mode (LM mode). In general, in luma-based chroma intra-prediction, chroma values in a block are predicted from down sampled reconstructed luma samples in the same block. More detailed descriptions of this coding tool for HEVC may be found, for example, in J. Kim, et al., "New Intra Chroma Prediction Using Inter-Channel Correlation," JCTVC-B021, Joint Collaborative Team on Video Coding (JCT-VC) of ITU-T SG16 WP3 and ISO/IEC JTC1/SC29/WG11, Geneva, CH, Jul. 21-28, 2010, J. Chen and V. Seregin, "Chroma Intra Prediction by Reconstructed Luma Samples," JCTVC-C206, Joint Collaborative Team on Video Coding (JCT-VC) of ITU-T SG16 WP3 and ISO/IEC JTC1/SC29/WG11, Guangzhou, Conn., Oct. 7-15, 2010, J. Chen, et al., "CE6.a: Chroma Intra Prediction by Reconstructed Luma Samples," JCTVC-D350, Joint Collaborative Team on Video Coding (JCT-VC) of ITU-T SG16 WP3 and ISO/IEC JTC1/SC29/WG11, Daegu, KR, Jan. 20-28, 2011, and J. Chen, et al., "CE6.a.4: Chroma Intra Prediction by Reconstructed Luma Samples," JCTVC-E266, Joint Collaborative Team on Video Coding (JCT-VC) of ITU-T SG16 WP3 and ISO/IEC JTC1/SC29/WG11, Geneva, CH, Mar. 16-23, 2011.

SUMMARY

Embodiments of the present invention relate to methods, apparatus, and computer readable media for luma-based chroma intra-prediction in video coding. In one aspect, a method for luma-based chroma intra-prediction in a video encoder or a video decoder is provided that includes down sampling a first reconstructed luma block of a largest coding unit (LCU), computing parameters $\alpha$ and $\beta$ of a linear model using immediate top neighboring reconstructed luma samples and left neighboring reconstructed luma samples of the first reconstructed luma block and reconstructed neighboring chroma samples of a chroma block corresponding to the first reconstructed luma block, wherein the linear model is $Pred_C[x,y]=\alpha \cdot Rec_L'[x,y]+\beta$, wherein x and y are sample coordinates, $Pred_C$ is predicted chroma samples, and $Rec_L'$ is samples of the down sampled first reconstructed luma block, and wherein the immediate top neighboring reconstructed luma samples are the only top neighboring reconstructed luma samples used, and computing samples of a first predicted chroma block from corresponding samples of the down sampled first reconstructed luma block using the linear model and the parameters.

In one aspect, a digital system configured to perform luma-based chroma intra-prediction is provided that includes means for down sampling a first reconstructed luma block of a largest coding unit (LCU), means for computing parameters $\alpha$ and $\beta$ of a linear model using immediate top neighboring reconstructed luma samples and left neighboring reconstructed luma samples of the first reconstructed luma block and reconstructed neighboring chroma samples of a chroma block corresponding to the first reconstructed luma block, wherein the linear model is $Pred_C[x,y]=\alpha \cdot Rec_L'[x,y]+\beta$, wherein x and y are sample coordinates, $Pred_C$ is predicted chroma samples, and $Rec_L'$ is samples of the down sampled first reconstructed luma block, and wherein the immediate top neighboring reconstructed luma samples are the only top neighboring reconstructed luma samples used, and means for computing samples of a first predicted chroma block from corresponding samples of the down sampled first reconstructed luma block using the linear model and the parameters.

In one aspect, a computer readable medium is provided that stores software instructions that when executed in a digital system cause the digital system to perform a method for luma-based chroma intra-prediction. The method includes down sampling a first reconstructed luma block of a largest coding unit (LCU), computing parameters $\alpha$ and $\beta$ of a linear model using immediate top neighboring reconstructed luma samples and left neighboring reconstructed luma samples of the first reconstructed luma block and reconstructed neighboring chroma samples of a chroma block corresponding to the first reconstructed luma block, wherein the linear model is $Pred_C[x,y]=\alpha \cdot Rec_L'[x,y]+\beta$, wherein x and y are sample coordinates, $Pred_C$ is predicted chroma samples, and $Rec_L'$ is samples of the down sampled first reconstructed luma block, and wherein the immediate top neighboring reconstructed luma samples are the only top neighboring reconstructed luma samples used, and computing samples of a first predicted chroma block from corresponding samples of the down sampled first reconstructed luma block using the linear model and the parameters.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
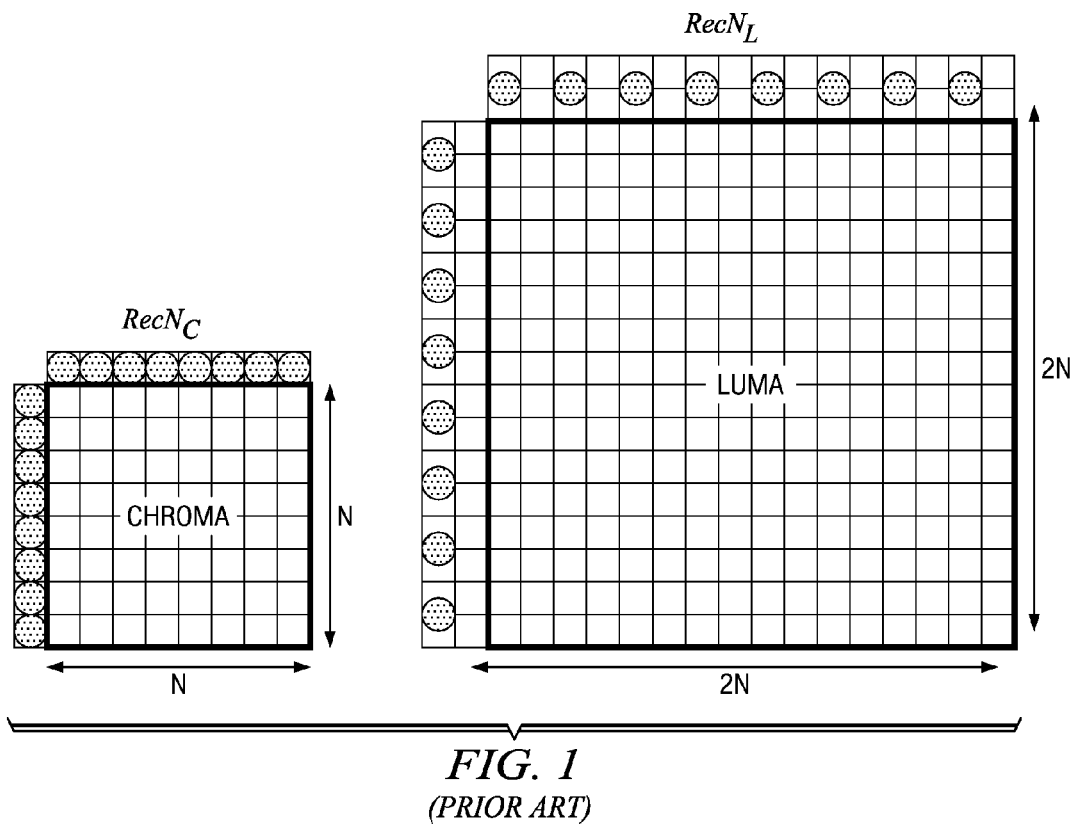
FIG. 1 illustrates prior art parameter derivation for luma-based chroma intra-prediction.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs.

For simplicity of explanation, a 4:2:0 sampling rate is assumed in which for each 2×2 luma sample, there are two corresponding chroma samples. Further, the following is assumed for intra-prediction of a CU. A CU can have one PU, i.e., the CU and the PU are the same, or four PUs. In addition, a TU may be no larger than a PU. More specifically, a CU may be divided into multiple TUs. If the CU is divided into four PUs, a TU may be no larger than these PUs. However, the four PUs can each be divided into multiple smaller TUs. If the CU is not subdivided, a TU can be no larger than the CU and the CU can also be divided into multiple smaller TUs. Each TU designates a luma block and the corresponding chroma block. That is, each luma block of a PU is the same size as and is in the same location in the PU as a TU. The size of a chroma block for a given luma block/TU is one half that of the luma block/TU. One of ordinary skill in the art, given the benefit of the description herein, will understand embodiments in which luma and chroma blocks in a block of video data may be derived differently for intra-prediction.

Some aspects of this disclosure have been presented to the JCT-VC in M. Budagavi and A. Osamoto, "Luma-Based Chroma Intra Prediction Simplification", JCTVC-F233, Joint Collaborative Team on Video Coding (JCT-VC) of ITU-T SG16 WP3 and ISO/IEC JTC1/SC29/WG11, Torino, IT, Jul. 14-22, 2011, which is incorporated by reference herein in its entirety.

As previously discussed, luma-based chroma intra-prediction, also referred to as linear method mode (LM mode), is a new coding tool proposed in HEVC. A prior art version of LM mode intra-prediction is described in detail in Weigand, et al., "WD3: Working Draft 3 of High-efficiency Video Coding," JCTVC-603, Mar. 16-23, 2011, Geneva, CH ("WD3" herein). In general, in luma-based chroma intra-prediction, chroma values for a block of video data, e.g., a TU, are predicted from down sampled reconstructed luma samples of the same block as follows:

$$Pred_C[x,y] = \alpha \cdot Rec_L'[x,y] + \beta \quad (1)$$

where $Pred_C$ is the predicted chroma samples and $Rec_L'$ is the down sampled reconstructed luma samples. In essence, the predicted chroma samples are modeled as a linear function of reconstructed luma samples of the luma block. The reconstructed luma samples are down sampled to match the size and phase of the chroma samples. Down sampling, also referred to as subsampling, is the process of reducing the sampling rate of a signal and is usually done to reduce the size of the data.

If $Rec_L$ is the reconstructed luma samples in a block, $Rec_L'$ is calculated as follows:

$$Rec_L'[x,y] = (Rec_L[2x,2y] + Rec_L[2x,2y+1]) >> 1. \quad (2)$$

Parameters $\alpha$ and $\beta$ are derived from reconstructed samples neighboring the current chroma and reconstructed luma blocks. FIG. 1 shows an example of the locations of these neighboring samples for an N×N chroma block and a 2N×2N reconstructed luma block in the prior art. In this figure, the shaded circles illustrate the positions of the reconstructed neighboring chroma and the down sampled reconstructed neighboring luma samples, $RecN_C$ and $RecN_L$, around the respective chroma and reconstructed luma block.

The ordinary least square (OLS) technique, also referred to as the linear least squares technique, is used to derive the parameters $\alpha$ and $\beta$:

$$\alpha = \frac{I \sum_{i=0}^{I-1} RecN_C(i) RecN_L(i) - \sum_{i=0}^{I-1} RecN_C(i) \sum_{i=0}^{I-1} RecN_L(i)}{I \sum_{i=0}^{I-1} RecN_L(i) RecN_L(i) - \left(\sum_{i=0}^{I-1} RecN_L(i)\right)^2} = \frac{A_1}{A_2} \quad (3)$$

$$\beta = \frac{\sum_{i=0}^{I-1} RecN_C(i) - \alpha \sum_{i=0}^{I-1} RecN_L(i)}{I} \quad (4)$$

where $RecN_C(i)$ and $RecN_L(i)$ are, respectively, the neighboring reconstructed chroma samples and the down sampled reconstructed neighboring luma samples and I is the total number of samples of the neighboring data. For a target N×N chroma block, when both left and top causal samples are available, the total number of involved samples is 2N. When only the left or top causal samples are available, the total number of involved samples is N.

Figure 2:
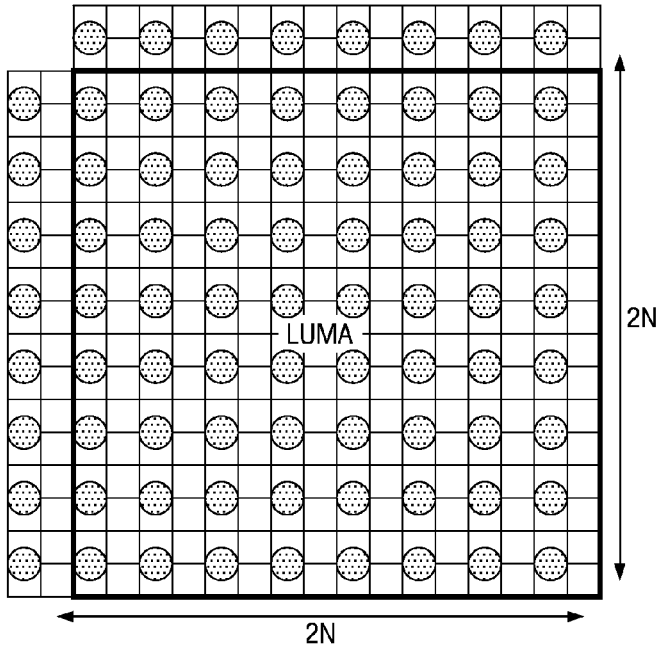
FIG. 2 illustrates prior art down sampling of a reconstructed luma block and neighboring samples for luma-based chroma intra-prediction.

In the prior art, e.g., WD3, for LM mode intra-prediction, the samples of the reconstructed luma block and the neighboring reconstructed luma samples are down sampled as shown in FIG. 2. In general, for the down sampling, pairs of pixels in every other column are averaged. Each shaded circle represents the average of the two samples it covers. This down sampling requires 2N second left neighboring reconstructed luma samples, 2N immediate top neighboring reconstructed luma samples, and 2N second top neighboring reconstructed luma samples. Using both the immediate top neighboring reconstructed luma samples and the second top neighboring reconstructed luma samples requires that these 4N samples be retained in memory when the PUs containing the samples are reconstructed in an encoder or a decoder. Further, because LCUs in a picture are encoded and decoded in row order, the bottom two rows of reconstructed luma samples from each row of LCUs in a picture except the last row need to be stored in memory for use in LM mode intra-prediction of the top PUs in the LCU row.

Figure 3:
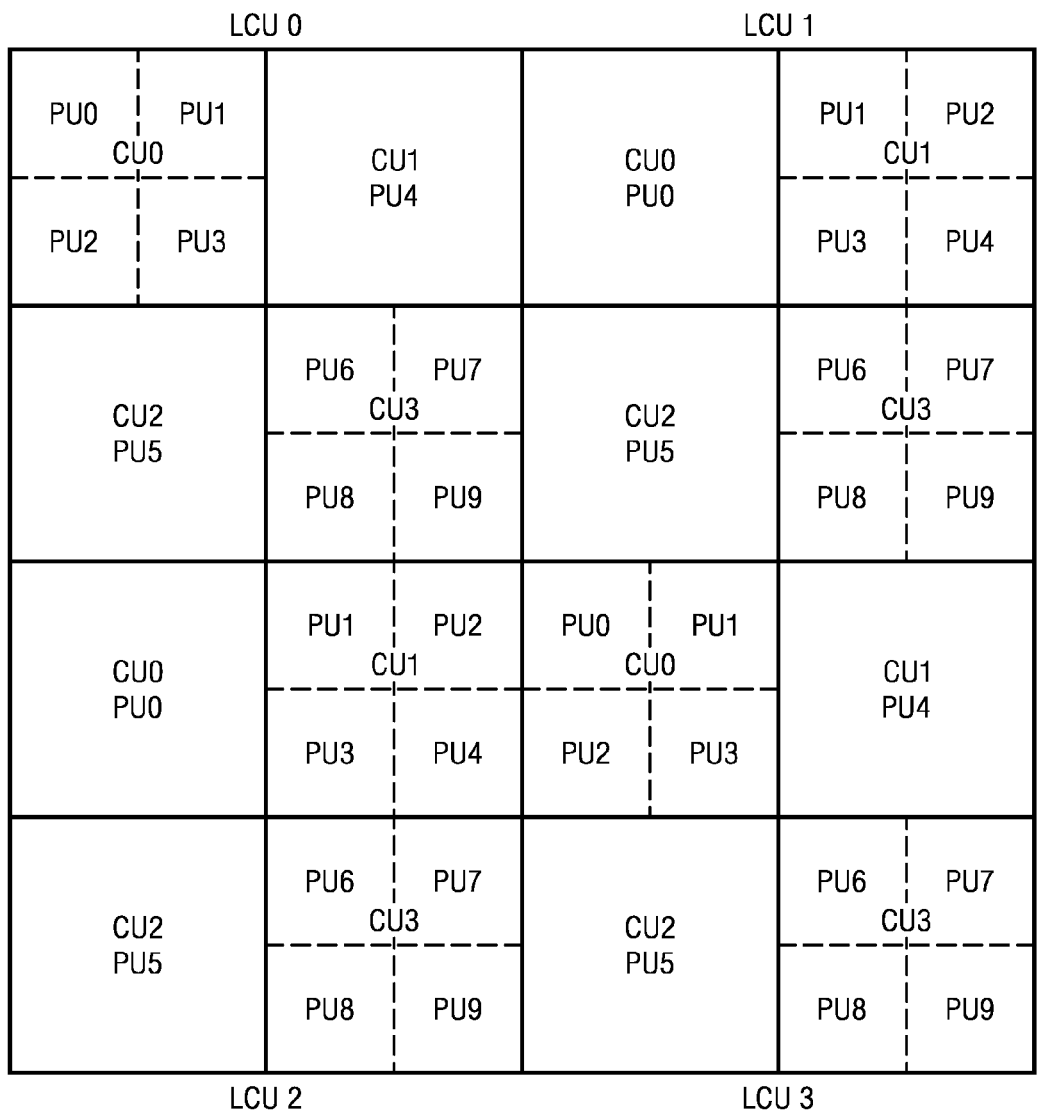
FIG. 3 is an example illustrating prior art luma-based chroma intra-prediction.

More specifically, consider the simple two LCU row example of FIG. 3. In this example, LCU 0 and LCU 1 are in one row of LCUs of a picture and LCU 2 and LCU 3 are in the next row of LCUs. Each LCU is divided into four CUs, CU0, CU1, CU2, and CU3. To support LM mode intra-prediction of PU0, PU1, and PU4 of LCU 0, PU0, PU1 and PU2 of LCU 1, PU0, PU1 and PU2 of LCU 2, and PU0, PU1, and PU4 of LCU 3, the last two rows of reconstructed luma samples of the PUs immediately above these PUs are needed. For example, for PU8 of LCU 0, the last two rows of reconstructed luma samples of PU6 are needed for LM mode intra-prediction of PU8. To support LM mode intra-prediction of PU0, PU1, and PU2 of LCU 2 and PU0, PU1, and PU4 of LCU 3, the last two rows of reconstructed luma samples of the PUs immediately above these PUS are needed. For example, for PU2 of LCU 2, the last two rows of reconstructed luma samples of PU9 in LCU 0 are needed for LM mode intra-prediction of PU2. Because the LCUs are encoded and decoded in row order, both LCU 0 and LCU 1 will be processed before LCU 2 and LCU 3. In order to have the reconstructed luma samples needed for LM mode intra-prediction of PU0, PU1, and PU2 of LCU 2 and PU0, PU1, and PU4 of LCU 3, the entire bottom two rows of reconstructed luma samples from LCU 0 and LCU 1 need to be stored.

Therefore, sufficient memory is needed to store two picture wide rows of reconstructed luma samples for LM mode intra-prediction. The amount of memory needed is significant given the large picture resolutions supported by HEVC. For example, picture resolutions at least as large as 8K×4K will be supported in the final standard. For embedded codecs such as those used in cellular telephones, digital cameras, set-top boxes, and other consumer devices, memory, especially the on-chip memory that would be preferred to meet throughput requirements, is expensive.

The memory used to store a row of neighboring reconstructed luma samples may be referred to as a line buffer. Accordingly, two line buffers are needed to store the two picture wide rows of reconstructed luma samples. A line buffer may be a specialized memory circuit designated for storage of a row of samples or may be a portion of memory in a larger memory circuit that is used to store a row of samples.

Figure 4:
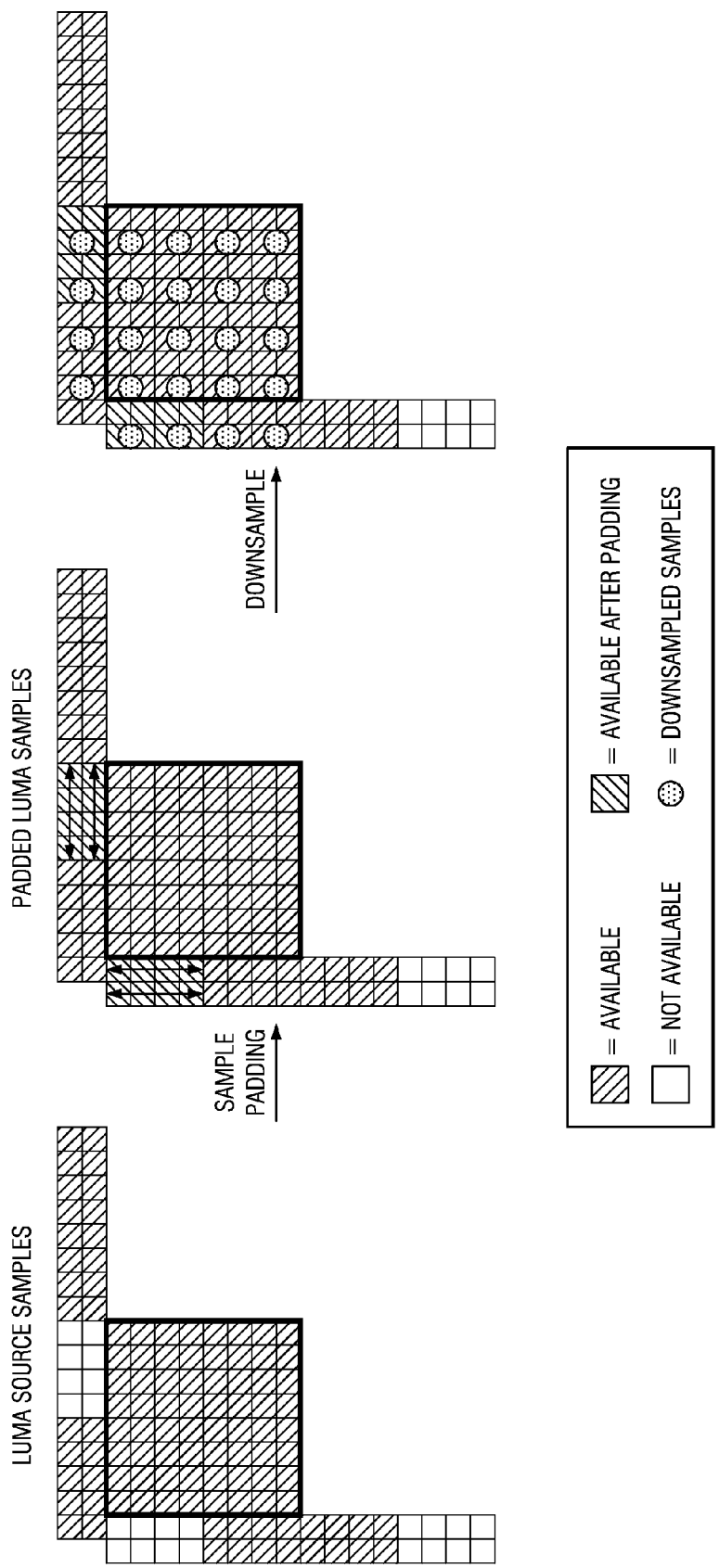
FIG. 4 illustrates prior art luma sample padding.

HEVC also defines a mode referred to as constrained intra-prediction mode that affects all intra-prediction modes. When this mode is enabled, samples from inter-predicted PUs cannot be used for intra-prediction in any intra-prediction mode. Instead, sample padding, also referred to as sample substitution, is used to supply values to replace the inter-predicted samples. For LM mode intra-prediction, the sample substitution has to be performed for both the immediate top neighboring reconstructed luma samples and the second top neighboring reconstructed luma samples as well as for the left neighboring reconstructed luma samples to replace any sample values from inter-predicted PUs. FIG. 4 shows a simple example of the prior art sample padding of luma samples. In this example, the samples designated as "not available" are from inter-predicted PUs. Sample padding is also performed on the left and top neighboring reconstructed chroma samples. A detailed explanation of the prior art sample substitution is available in WD3.

This sample substitution process increases the time needed to perform intra-prediction which may make it difficult to meet throughput requirements. For example, in some pipelined codec architectures, intra-prediction, transformation, and quantization are performed in the same pipeline stage, so any increase in the time needed to perform intra-prediction is a concern.

Embodiments of the invention provide for simplification of the above described luma-based chroma intra-prediction by eliminating the use of the second top neighboring reconstructed luma samples in the derivation of the parameters $\alpha$ and $\beta$ for LM mode intra-prediction of PUs at the top boundaries of LCUs. In some embodiments, the use of the second top neighboring reconstructed luma samples in the derivation of the parameters $\alpha$ and $\beta$ for LM mode intra-prediction is eliminated for all PUs.

Figure 5:
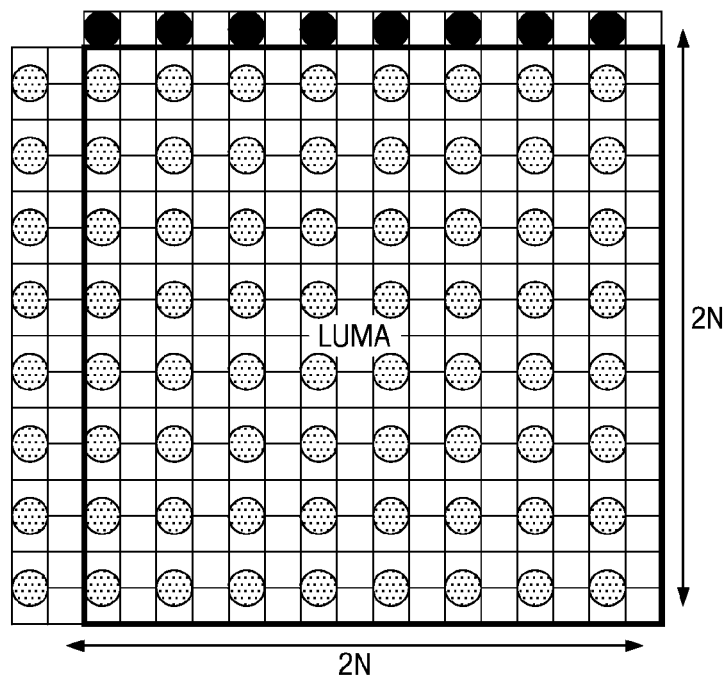
FIG. 5 illustrates down sampling of a reconstructed luma block and neighboring samples for luma-based chroma intra-prediction.

Eliminating the use of the second top neighboring reconstructed samples for LM mode intra-prediction of the PUs at the top boundaries of LCUs eliminates the need to store a picture wide row of these samples, thus reducing the memory needed to support LM mode intra-prediction. It also simplifies the down sampling computation. FIG. 5 shows an example of the down sampling when the immediate top neighboring reconstructed luma samples are used. The black circles represent the down sampled immediate top neighboring reconstructed luma samples. No averaging computation is needed to down sample these luma samples. Rather, the samples in every other column may be used. The down sampling for the remaining reconstructed luma samples remains the same and the shaded circles represent the down sampled values.

Figure 6:
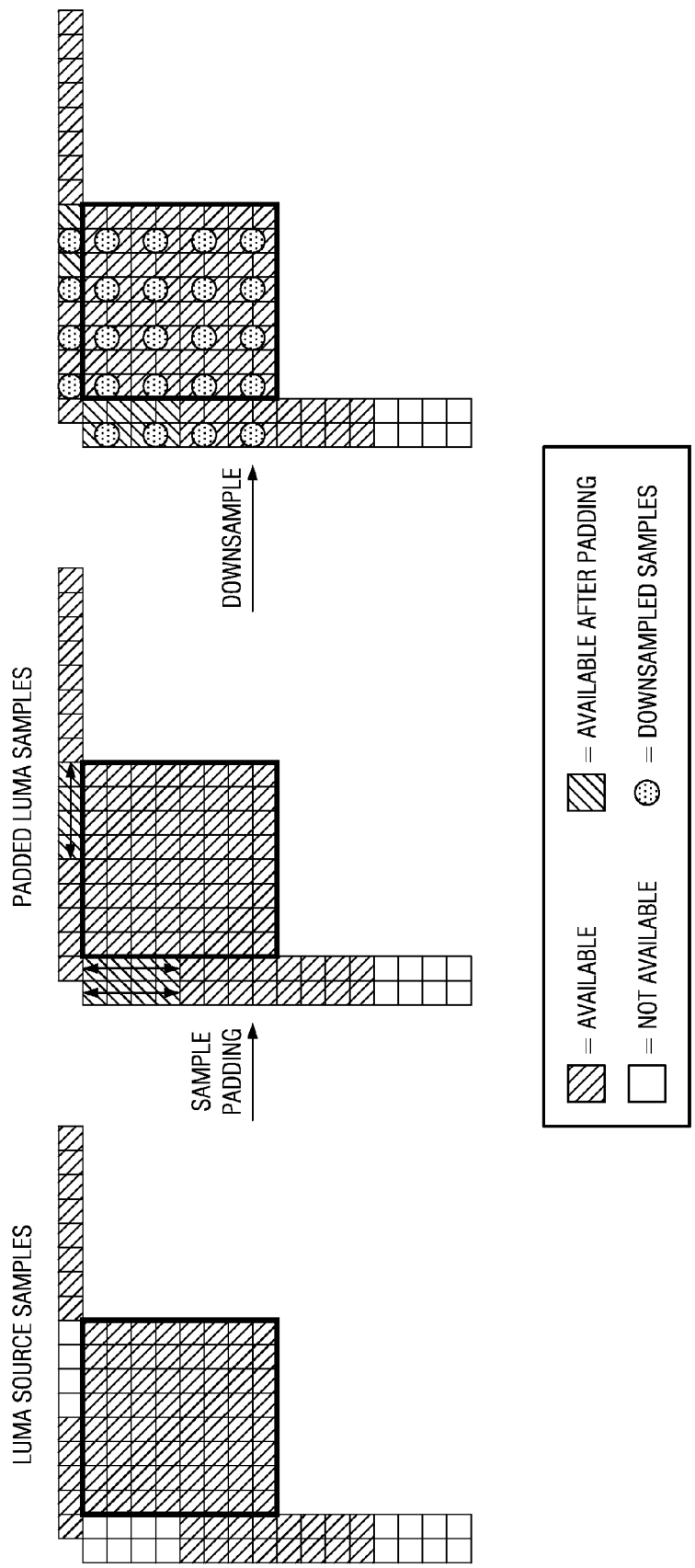
FIG. 6 illustrates luma sample padding.

Eliminating the use of the second top neighboring reconstructed samples also reduces the number of samples that may need to be padded. FIG. 6 shows a simple example of luma sample padding when only the immediate top neighboring reconstructed luma samples are used instead of using both the immediate top and second top neighboring samples. In this example, the samples designated as "not available" are from inter-predicted PUs. The video coding standard in use, e.g., HEVC, defines how the sample padding is performed. A detailed description of one technique for sample padding when only the immediate top neighboring reconstructed luma samples are used can be found in Bross, et al., "High Efficiency Video Coding (HEVC) Text Specification Draft 7," JCTVC-I1003_d4, Apr. 27-May 7, 2012, Geneva, CH ("WD7" herein), which is incorporated by reference herein in its entirety.

Figure 7:
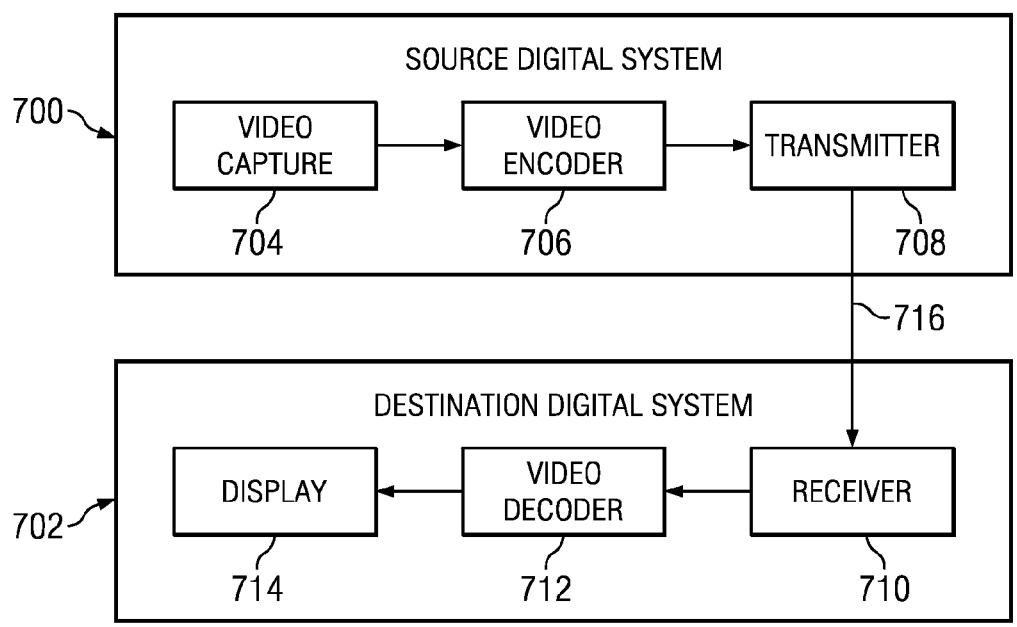
FIG. 7 is a block diagram of a digital system.

FIG. 7 shows a block diagram of a digital system that includes a source digital system 700 that transmits encoded video sequences to a destination digital system 702 via a communication channel 716. The source digital system 700 includes a video capture component 704, a video encoder component 706, and a transmitter component 708. The video capture component 704 is configured to provide a video sequence to be encoded by the video encoder component 706. The video capture component 704 may be, for example, a video camera, a video archive, or a video feed from a video content provider. In some embodiments, the video capture component 704 may generate computer graphics as the video sequence, or a combination of live video, archived video, and/or computer-generated video.

The video encoder component 706 receives a video sequence from the video capture component 704 and encodes it for transmission by the transmitter component 708. The video encoder component 706 receives the video sequence from the video capture component 704 as a sequence of pictures, divides the pictures into largest coding units (LCUs), and encodes the video data in the LCUs. The video encoder component 706 may be configured to apply luma-based chroma intra-prediction techniques during the encoding process as described herein. An embodiment of the video encoder component 706 is described in more detail herein in reference to FIG. 8.

The transmitter component 708 transmits the encoded video data to the destination digital system 702 via the communication channel 716. The communication channel 716 may be any communication medium, or combination of communication media suitable for transmission of the encoded video sequence, such as, for example, wired or wireless communication media, a local area network, or a wide area network.

The destination digital system 702 includes a receiver component 710, a video decoder component 712 and a display component 714. The receiver component 710 receives the encoded video data from the source digital system 700 via the communication channel 716 and provides the encoded video data to the video decoder component 712 for decoding. The video decoder component 712 reverses the encoding process performed by the video encoder component 706 to reconstruct the LCUs of the video sequence. The video decoder component 712 may be configured to apply luma-based chroma intra-prediction techniques during the decoding process as described herein. An embodiment of the video decoder component 712 is described in more detail below in reference to FIG. 9.

The reconstructed video sequence is displayed on the display component 714. The display component 714 may be any suitable display device such as, for example, a plasma display, a liquid crystal display (LCD), a light emitting diode (LED) display, etc.

In some embodiments, the source digital system 700 may also include a receiver component and a video decoder component and/or the destination digital system 702 may include a transmitter component and a video encoder component for transmission of video sequences both directions for video steaming, video broadcasting, and video telephony. Further, the video encoder component 706 and the video decoder component 712 may perform encoding and decoding in accordance with one or more video compression standards. The video encoder component 706 and the video decoder component 712 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 8:
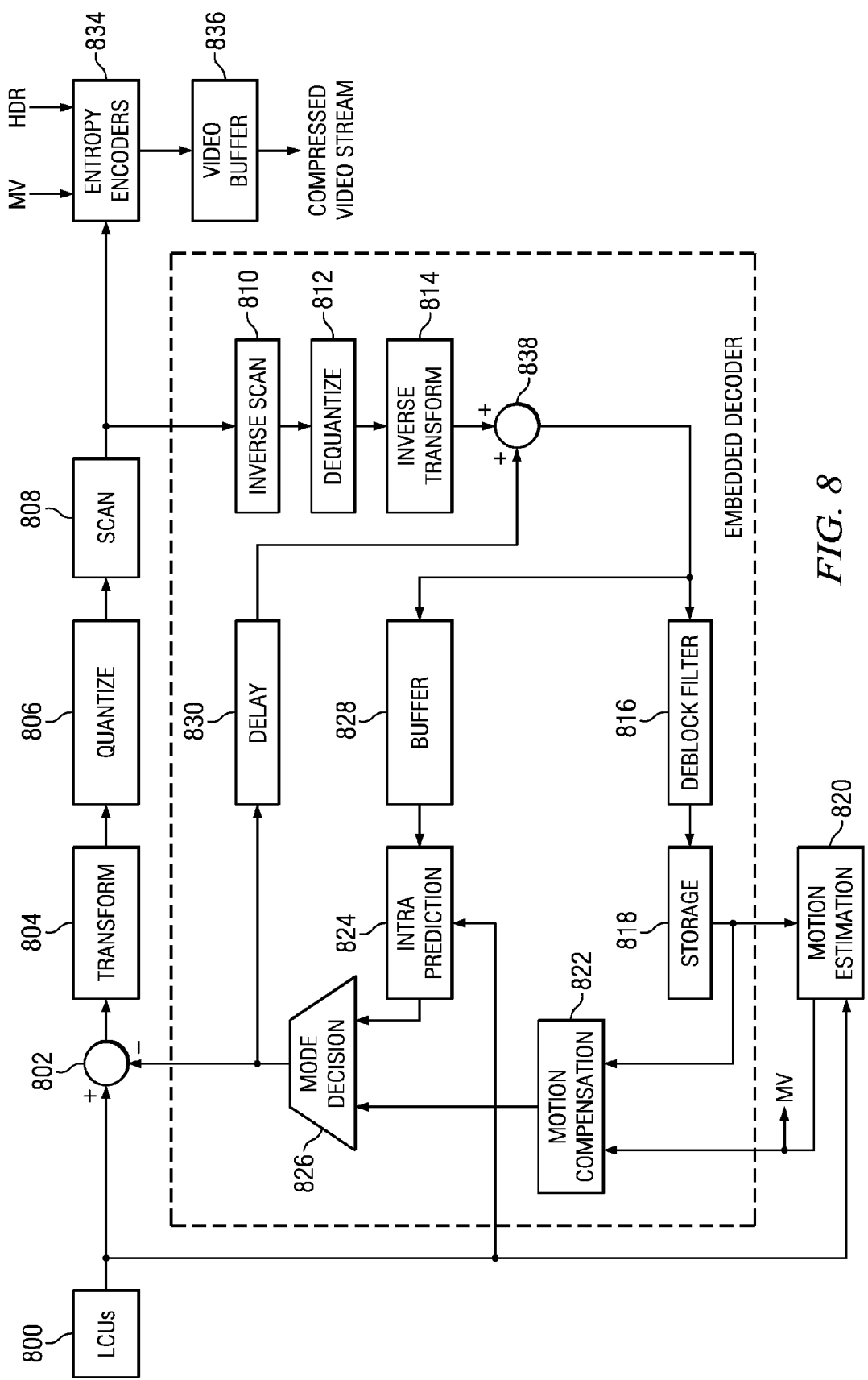
FIG. 8 is a block diagram of a video encoder.

FIG. 8 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

In addition, for pipelined architectures in which multiple PUs and CUs may be processed concurrently in different components of the LCU processing, the coding control component controls the processing of PUs and CUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different blocks of a picture at any given time. That is, the slave processing modules are executed in parallel, each processing its respective block while data movement from one processor to another is serial.

The LCU processing receives LCUs of the input video sequence from the coding control component and encodes the LCUs under the control of the coding control component to generate the compressed video stream. The LCUs in each picture are processed in row order. The CUs in the CU structure of an LCU may be processed by the LCU processing in a depth-first Z-scan order. The LCUs 800 from the coding control unit are provided as one input of a motion estimation component 820, as one input of an intra-prediction component 824, and to a positive input of a combiner 802 (e.g., adder or subtractor or the like). Further, although not specifically shown, the prediction mode of each picture as selected by the coding control component is provided to a mode selector component and the entropy encoder 834.

The storage component 818 provides reference data to the motion estimation component 820 and to the motion compensation component 822. The reference data may include one or more previously encoded and decoded CUs, i.e., reference CUs.

The motion estimation component 820 provides motion data information to the motion compensation component 822 and the entropy encoder 834. More specifically, the motion estimation component 820 performs tests on CUs in an LCU based on multiple inter-prediction modes (e.g., skip mode, merge mode, and normal or direct inter-prediction) and transform block sizes using reference picture data from storage 818 to choose the best motion vector(s)/prediction mode based on a rate distortion coding cost. To perform the tests, the motion estimation component 820 may begin with the CU structure provided by the coding control component. The motion estimation component 820 may divide each CU indicated in the CU structure into PUs according to the unit sizes of prediction modes and into transform units according to the transform block sizes and calculate the coding costs for each prediction mode and transform block size for each CU. The motion estimation component 820 may also compute CU structure for the LCU and PU/TU partitioning structure for a CU of the LCU by itself.

For coding efficiency, the motion estimation component 820 may also decide to alter the CU structure by further partitioning one or more of the CUs in the CU structure. That is, when choosing the best motion vectors/prediction modes, in addition to testing with the initial CU structure, the motion estimation component 820 may also choose to divide the larger CUs in the initial CU structure into smaller CUs (within the limits of the recursive quadtree structure), and calculate coding costs at lower levels in the coding hierarchy. If the motion estimation component 820 changes the initial CU structure, the modified CU structure is communicated to other components that need the information.

The motion estimation component 820 provides the selected motion vector (MV) or vectors and the selected prediction mode for each inter-predicted PU of a CU to the motion compensation component 822 and the selected motion vector (MV), reference picture index (indices), prediction direction (if any) to the entropy encoder 834

The motion compensation component 822 provides motion compensated inter-prediction information to the mode decision component 826 that includes motion compensated inter-predicted PUs, the selected inter-prediction modes for the inter-predicted PUs, and corresponding transform block sizes. The coding costs of the inter-predicted PUs are also provided to the mode decision component 826.

The intra-prediction component 824 provides intra-prediction information to the mode decision component 826 that includes intra-predicted PUs and the corresponding intra-prediction modes. That is, the intra-prediction component 824 performs intra-prediction in which tests based on multiple intra-prediction modes and transform unit sizes are performed on CUs in an LCU using previously encoded neighboring PUs from the buffer 828 to choose the best intra-prediction mode for each PU in the CU based on a coding cost. As is well known, a block of video data includes both luma data and chroma data, which may be encoded separately. Different intra-prediction modes may be used for luma blocks and chroma blocks in a PU.

One of the intra-prediction modes considered by the intra-prediction component 824 for chroma is a luma-based chroma intra-prediction mode, i.e., LM mode intra-prediction. The luma-based chroma intra-prediction may be performed according to methods described herein. As is described in more detail herein, the LM mode intra-prediction uses immediate top neighboring reconstructed luma samples and second left neighboring reconstructed luma samples to derive the parameters α and β for LM mode intra-prediction of PUs at the top boundaries of LCUs. These immediate top neighboring reconstructed samples are stored in a portion of the buffer 828 designated for storing a picture wide row of such samples. This portion of the buffer 828 is referred to as a top neighboring sample line buffer herein. The second left neighboring reconstructed luma samples are also stored in the buffer 828.

In some embodiments, LM mode intra-prediction of PUs not at the top boundaries of LCUs also uses immediate top neighboring reconstructed luma samples and second left neighboring reconstructed luma samples to derive the parameters α and β. In some embodiments, LM mode intra-prediction of PUs not at the top boundaries of LCUs uses both immediate top neighboring reconstructed luma samples and second top neighboring reconstructed luma samples together with the second left neighboring reconstructed luma samples to derive the parameters α and β. The reconstructed neighboring samples needed for LM mode intra-prediction of the PUs not at the top boundaries of LCUs are also stored in the buffer 828.

If constrained intra-prediction mode is enabled, the intra-prediction component 824 performs sample padding as needed before using the reconstructed neighboring luma and chroma samples to derive the parameters α and β. In general, the sample padding replaces any samples in the reconstructed neighboring samples that are from inter-predicted PUs with sample values better suited for intra-prediction. The sample padding process is defined by the video coding standard in use, e.g., HEVC. A detailed description of one suitable technique for sample padding is described in WD7.

To perform the tests, the intra-prediction component 824 may begin with the CU structure provided by the coding control. The intra-prediction component 824 may divide each CU indicated in the CU structure into PUs according to the unit sizes of the intra-prediction modes and into transform units according to the transform block sizes and calculates the coding costs for each prediction mode and transform block size for each PU. For coding efficiency, the intra-prediction component 824 may also decide to alter the CU structure by further partitioning one or more of the CUs in the CU structure. That is, when choosing the best prediction modes, in addition to testing with the initial CU structure, the intra-prediction component 824 may also chose to divide the larger CUs in the initial CU structure into smaller CUs (within the limits of the recursive quadtree structure), and calculate coding costs at lower levels in the coding hierarchy. If the intra-prediction component 824 changes the initial CU structure, the modified CU structure is communicated to other components that need the information. Further, the coding costs of the intra-predicted PUs and the associated transform block sizes are also provided to the mode decision component 826.

The mode decision component 826 selects between the motion-compensated inter-predicted PUs from the motion compensation component 822 and the intra-predicted PUs from the intra-prediction component 824 based on the coding costs of the PUs and the picture prediction mode provided by the mode selector component. The decision is made at CU level. Based on the decision as to whether a CU is to be intra- or inter-coded, the intra-predicted PUs or inter-predicted PUs are selected, accordingly.

The output of the mode decision component 826, i.e., the predicted PU, is provided to a negative input of the combiner 802 and to a delay component 830. The associated transform block size is also provided to the transform component 804. The output of the delay component 830 is provided to another combiner (i.e., an adder) 838. The combiner 802 subtracts the predicted PU from the current PU to provide a residual PU to the transform component 804. The resulting residual PU is a set of pixel difference values that quantify differences between pixel values of the original PU and the predicted PU. The residual blocks of all the PUs of a CU form a residual CU block for the transform component 804.

The transform component 804 performs block transforms on the residual CU to convert the residual pixel values to transform coefficients and provides the transform coefficients to a quantize component 806. The transform component 804 receives the transform block sizes for the residual CU and applies transforms of the specified sizes to the CU to generate transform coefficients.

The quantize component 806 quantizes the transform coefficients based on quantization parameters (QPs) and quantization matrices provided by the coding control component and the transform sizes. The quantized transform coefficients are taken out of their scan ordering by a scan component 808 and arranged by significance, such as, for example, beginning with the more significant coefficients followed by the less significant.

The ordered quantized transform coefficients for a CU provided via the scan component 808 along with header information for the CU are coded by the entropy encoder 834, which provides a compressed bit stream to a video buffer 836 for transmission or storage. The header information may include the prediction mode used for the CU. The entropy encoder 834 also encodes the CU and PU structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 808 are returned to their original post-transform arrangement by an inverse scan component 810, the output of which is provided to a dequantize component 812, which outputs a reconstructed version of the transform result from the transform component 804.

The dequantized transform coefficients are provided to the inverse transform component 814, which outputs estimated residual information representing a reconstructed version of a residual CU. The inverse transform component 814 receives the transform block size used to generate the transform coefficients and applies inverse transform(s) of the specified size to the transform coefficients to reconstruct the residual values.

The reconstructed residual CU is provided to the combiner 838. The combiner 838 adds the delayed selected CU to the reconstructed residual CU to generate a reconstructed CU, which becomes part of reconstructed picture data. The reconstructed picture data is stored in a buffer 828 for use by the intra-prediction component 824 and is provided to an in-loop filter component 816. When the reconstructed CU is a CU at the bottom boundary of an LCU, the last row of reconstructed samples in the CU is also stored in the top neighboring sample line buffer in the buffer 828 for use by the intra-prediction component 824 in LM mode intra-prediction of the PUs at the top boundaries of LCUs in the next LCU row.

The in-loop filter component 816 applies various filters to the reconstructed picture data to generate final reference picture data. The filtering may be performed, for example, on an LCU-by-LCU basis or on a picture basis. This filtering is performed to improve the reference pictures used for encoding/decoding of subsequent pictures. The in-loop filter component 816 may, for example, adaptively apply low-pass filters to block boundaries according to the boundary strength to alleviate blocking artifacts causes by the block-based video coding. The final reference picture data is provided to storage component 818.

Figure 9:
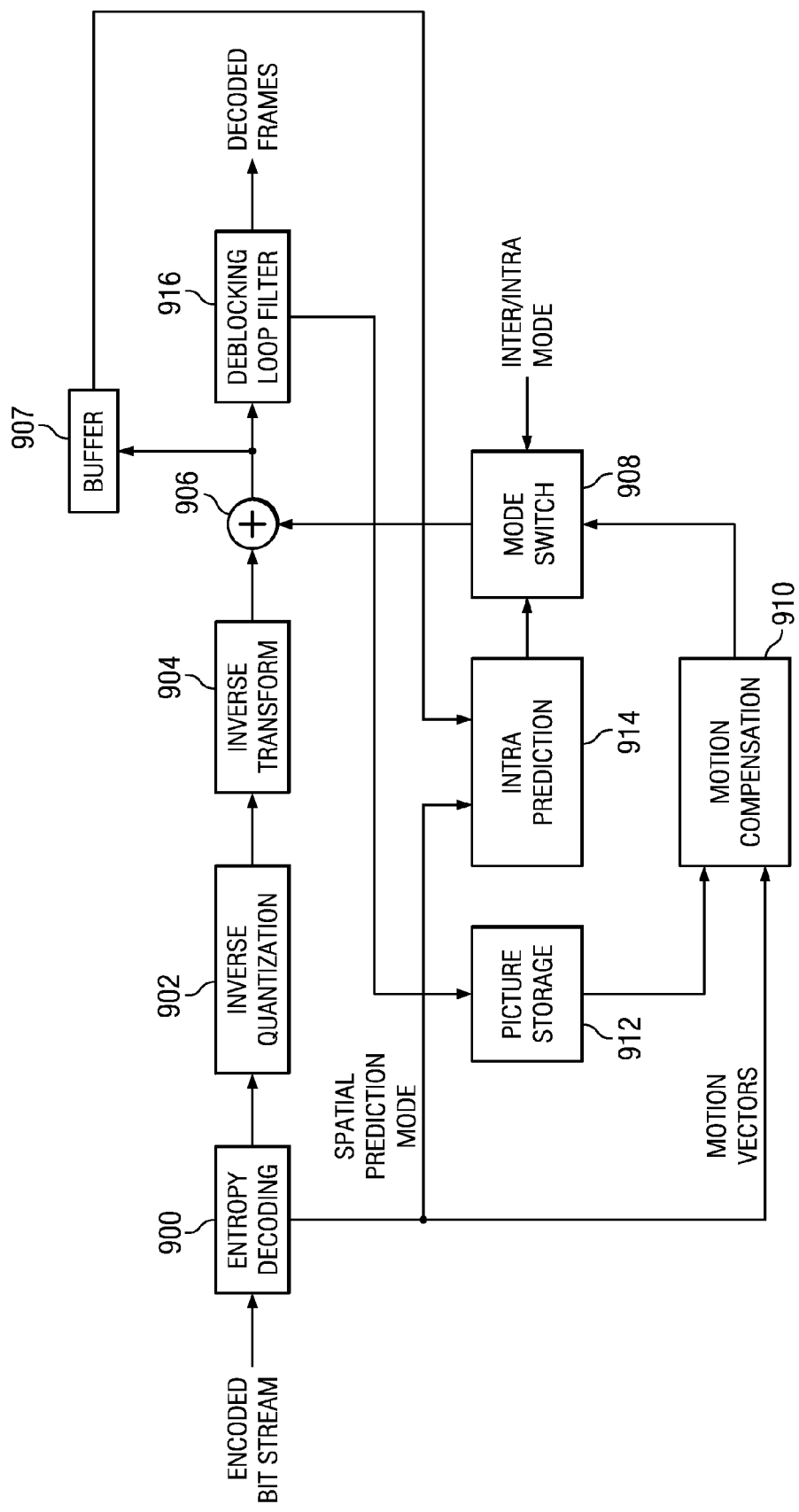
FIG. 9 is a block diagram of a video decoder.

FIG. 9 shows a block diagram of an example video decoder. The video decoder operates to reverse the encoding operations, i.e., entropy coding, quantization, transformation, and prediction, performed by the video encoder of FIG. 8 to regenerate the pictures of the original video sequence. In view of the above description of a video encoder, one of ordinary skill in the art will understand the functionality of components of the video decoder without detailed explanation.

The entropy decoding component 900 receives an entropy encoded (compressed) video bit stream and reverses the entropy coding to recover the encoded PUs and header information such as the prediction modes and the encoded CU and PU structures of the LCUs. If the decoded prediction mode is an inter-prediction mode, the entropy decoder 900 then reconstructs the motion vector(s) as needed and provides the motion vector(s) to the motion compensation component 910.

The inverse quantization component 902 de-quantizes the quantized transform coefficients of the residual CU. The inverse transform component 904 transforms the frequency domain data from the inverse quantization component 902 back to the residual CU. That is, the inverse transform component 904 applies an inverse unit transform, i.e., the inverse of the unit transform used for encoding, to the de-quantized residual coefficients to produce the residual CUs.

A residual CU supplies one input of the addition component 906. The other input of the addition component 906 comes from the mode switch 908. When an inter-prediction mode is signaled in the encoded video stream, the mode switch 908 selects predicted PUs from the motion compensation component 910 and when an intra-prediction mode is signaled, the mode switch selects predicted PUs from the intra-prediction component 914.

The motion compensation component 910 receives reference data from storage 912 and applies the motion compensation computed by the encoder and transmitted in the encoded video bit stream to the reference data to generate a predicted PU. That is, the motion compensation component 910 uses the motion vector(s) from the entropy decoder 900 and the reference data to generate a predicted PU.

The intra-prediction component 914 receives reconstructed samples from previously reconstructed PUs of a current picture from the buffer 907 and performs the intra-prediction computed by the encoder as signaled by an intra-prediction mode transmitted in the encoded video bit stream using the reconstructed samples as needed to generate a predicted PU. If LM mode intra-prediction is signaled, the intra-prediction component 914 may perform the luma-based chroma intra-prediction according to methods described herein.

As is described in more detail herein, the LM mode intra-prediction uses immediate top neighboring reconstructed luma samples and second left neighboring reconstructed luma samples to derive the parameters $\alpha$ and $\beta$ for LM mode intra-prediction of PUs at the top boundaries of LCUs. These immediate top neighboring reconstructed samples are stored in a portion of the buffer 907 designated for storing a picture wide row of such samples. This portion of the buffer 907 is referred to as a top neighboring sample line buffer herein. The second left neighboring reconstructed luma samples are also stored in the buffer 907.

In some embodiments, LM mode intra-prediction of PUs not at the top boundaries of LCUs also uses immediate top neighboring reconstructed luma samples and second left neighboring reconstructed luma samples to derive the parameters $\alpha$ and $\beta$. In some embodiments, LM mode intra-prediction of PUs not at the top boundaries of LCUs uses both immediate top neighboring reconstructed luma samples and second top neighboring reconstructed luma samples together with the second left neighboring reconstructed luma samples to derive the parameters $\alpha$ and $\beta$. The reconstructed neighboring samples needed for LM mode intra-prediction of the PUs not at the top boundaries of LCUs are also stored in the buffer 907. If constrained intra-prediction mode is enabled, the intra-prediction component 914 performs sample padding as needed before using the reconstructed neighboring samples to derive the parameters $\alpha$ and $\beta$. The sample padding is the same as that performed in the encoder.

The addition component 906 generates a reconstructed CU by adding the predicted PUs selected by the mode switch 908 and the residual CU. The output of the addition component 906, i.e., the reconstructed CUs, supplies the input of the in-loop filter component 916 and is also stored in the buffer 907 for use by the intra-prediction component 914. When the reconstructed CU is a CU at the bottom boundary of an LCU, the last row of reconstructed samples in the CU is also stored in the top neighboring sample line buffer in the buffer 907 for use by the intra-prediction component 914 in LM mode intra-prediction of PUs at the top boundaries of LCUs in the next LCU row.

The in-loop filter component 916 performs the same filtering as the encoder. The output of the in-loop filter component 916 is the decoded pictures of the video bit stream. Further, the output of the in-loop filter component 916 is stored in storage 912 to be used as reference data by the motion compensation component 908.

Embodiments of the encoder and the decoder may be implemented in hardware, software, firmware, or any combination thereof. In some embodiments, the buffers 828 and 907 used to store reconstructed samples for intra-prediction may be implemented in an on-chip memory of an embedded codec. In some such embodiments, the top neighboring sample line buffers may be implemented as a portion of this on-chip memory. In some such embodiments, the top neighboring sample line buffers may be implemented as on-chip hardware line buffers.

If embodiments are completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Figure 10:
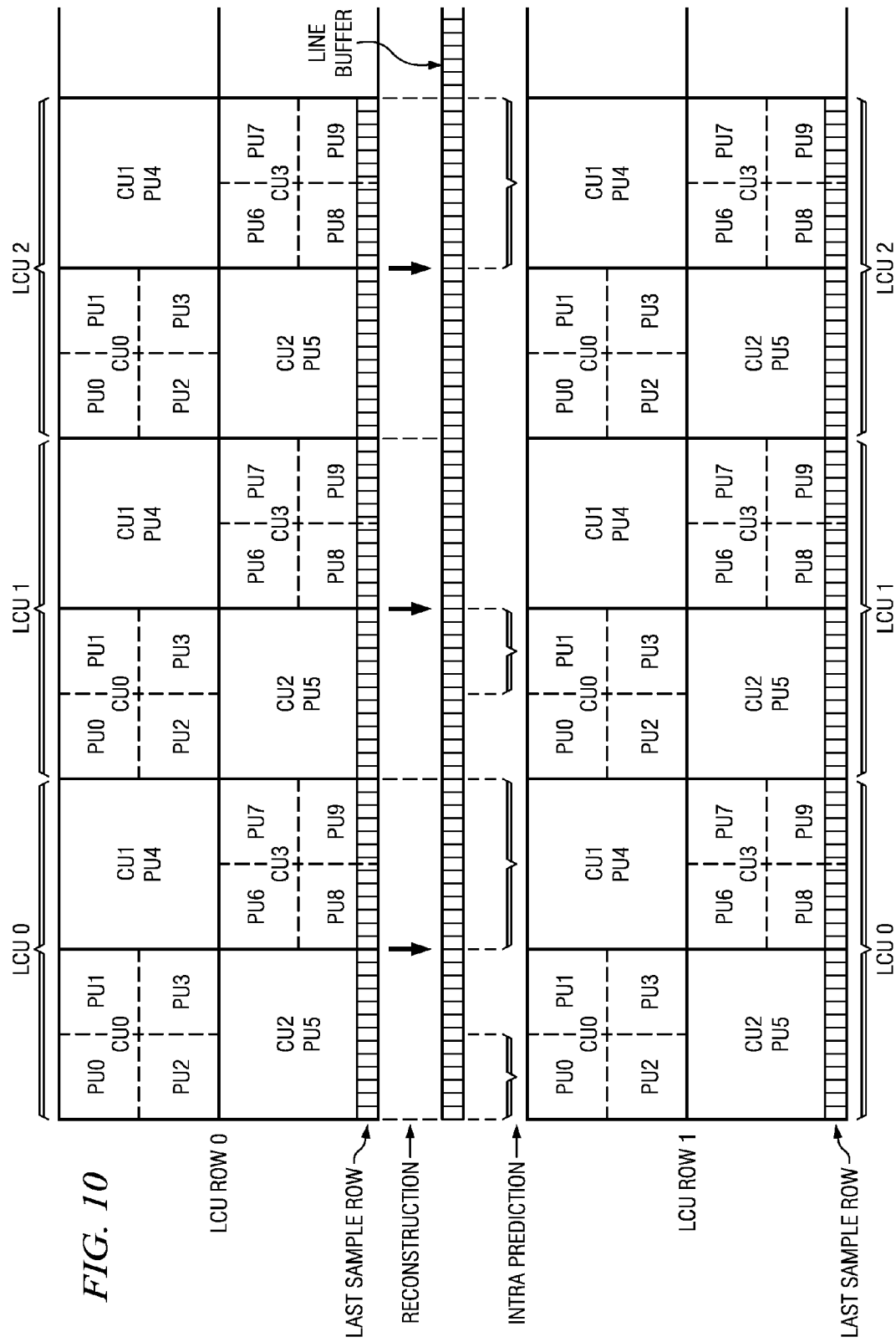
FIG. 10 is an example illustrating use of a line buffer in luma-based chroma intra-prediction.

FIG. 10 shows a simplified example illustrating the use of a top neighboring sample line buffer in an encoder or a decoder. The CU and PU structure of each LCU is depicted as being identical for simplicity of explanation. One of ordinary skill in the art will understand that CU and PU structures may vary and are not necessarily the same for each LCU. In this example, two LCU rows of a picture are depicted, LCU Row 0 and LCU Row 1. As the LCUs of LCU Row 0 are reconstructed in an encoder or decoder, the last row of samples in each reconstructed CU at the bottom boundary of each LCU in the row, i.e., CU2 and CU3 of each of LCU 0, LCU 1, and LCU 2, is stored in the sample line buffer after each CU is reconstructed. The reconstructed samples are stored in the line buffer for both intra-predicted and inter-predicted CUs.

Then, as the LCUs of Row 1 are processed, and assuming that constrained intra-prediction mode is not enabled, the reconstructed samples in the line buffer are used for LM mode intra-prediction of the PUs at the top boundary of each LCU in the row, i.e., PU0, PU1, and PU4 of each of LCU 0, LCU 1, and LCU 2. For each of these PUs, the reconstructed samples that correspond to the immediate top neighboring reconstructed samples of the PU are read from the line buffer. For example, in this simple example, for LM mode prediction of PU0 of CU0 of LCU 0, a portion of the reconstructed samples from the last row of PU5 of CU2 of LCU 0 of LCU Row 0 are read. In another example, for LM mode prediction of PU4 of CU0 of LCU 0, the reconstructed samples from the last rows of PU8 and PU9 of CU3 of LCU 0 of LCU Row 0 are read. In an encoder, since LM mode intra-prediction is considered for all PUs, all of the reconstructed samples in the line buffer will be used. In a decoder, reconstructed samples in the line buffer are used only for those PUs that were encoded using LM mode intra-prediction.

If constrained intra-prediction mode is enabled, any reconstructed samples in the line buffer that are from inter-predicted PUs cannot be used for LM mode intra-prediction (or for any other intra-prediction mode). In such cases, prior to performing intra-prediction on a PU at the top boundary of an LCU in LCU Row 1, sample padding is performed to replace any reconstructed samples in the line buffer that came from an inter-predicted PU and may be used for intra-prediction of the PU with samples more suitable for intra-prediction. For example, if PU8 and PU9 of CU3 of LCU2 in LCU Row 0 are inter-predicted, then any reconstructed samples from these two PUs will be replaced by the sample padding prior to performing intra-prediction on PU4 of LCU 2 in LCU Row 1.

Figure 11:
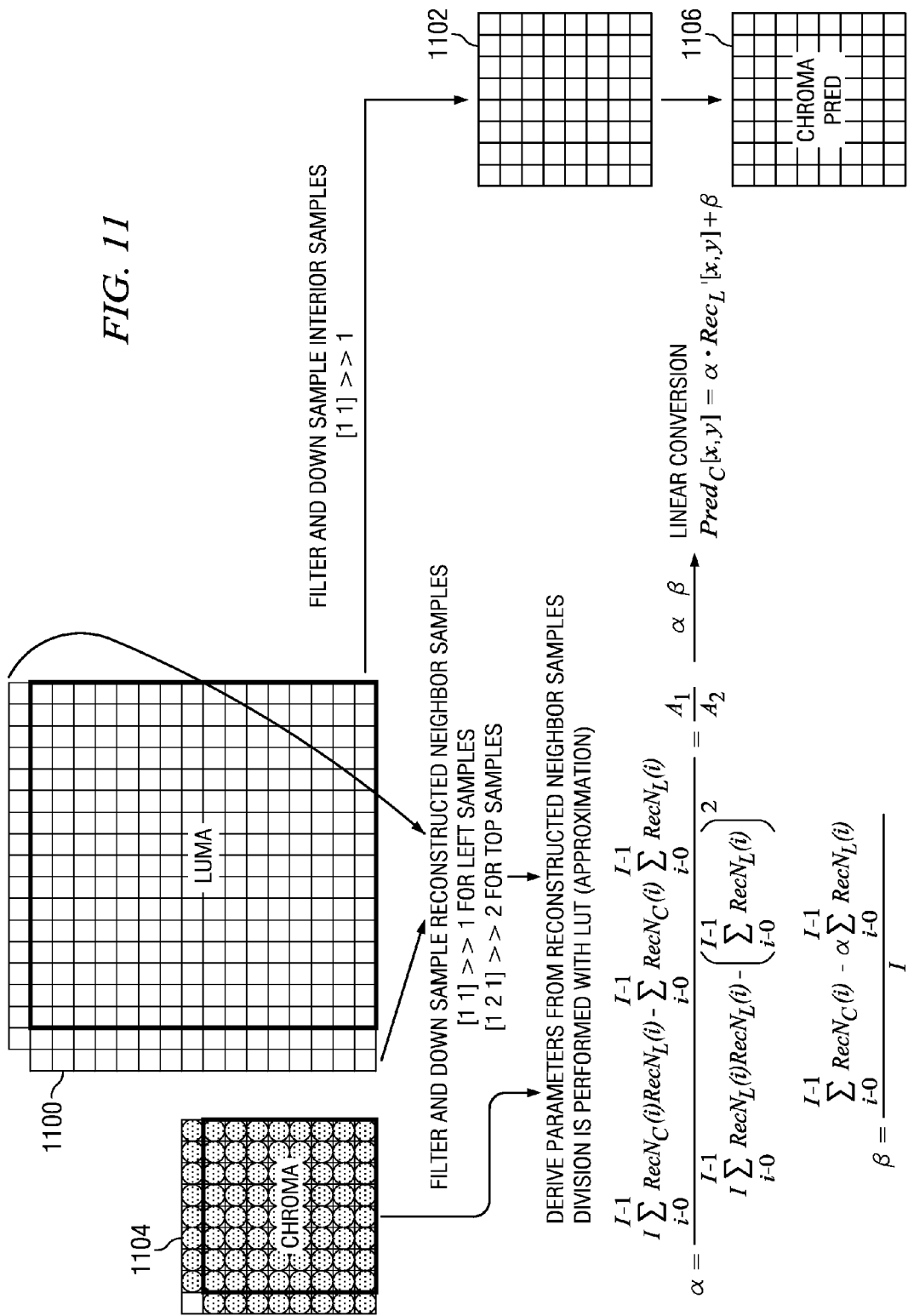
FIGS. 11-13 are flow diagrams of methods.

FIG. 11 shows a method for LM mode intra-prediction of a chroma block using immediate top neighboring reconstructed luma samples and second left neighboring reconstructed luma samples. This method may be used in an encoder or a decoder. The interior samples of the reconstructed luma block 1100 corresponding to the chroma block are filtered and down sampled to generate a filtered, down sampled luma block 1102 for generating the predicted chroma block. The immediate top neighboring reconstructed luma samples and second left neighboring reconstructed luma samples of the reconstructed luma block 1100 are also filtered and down sampled for use in deriving the parameters $\alpha$ and $\beta$. In some embodiments, if the reconstructed luma block 1100 is at the top boundary of an LCU, the immediate top neighboring reconstructed luma samples are accessed from a top neighboring sample line buffer. In some such embodiments, if the reconstructed luma block 1100 is not at the top boundary of an LCU, the immediate top neighboring reconstructed luma samples are accessed from a buffer storing reconstructed blocks for use in intra-prediction.

Although not specifically shown, in some embodiments, intra-prediction modes may optionally be constrained such that these modes are not allowed to use samples from inter-predicted blocks. In such embodiments, when the constraint is enabled, sample padding is performed on the immediate top neighboring reconstructed luma samples and second left neighboring reconstructed luma samples prior to the filtering and down sampling to replace any samples from inter-predicted blocks.

The parameters $\alpha$ and $\beta$ are then derived using the top and left neighboring reconstructed chroma samples, $RecN_C(i)$, of the corresponding chroma block 1104 and the filtered, down sampled immediate top and second left neighboring reconstructed samples, $RecN_L(i)$, of the luma block 1100 as per Eq. 3 and 4. The division operations may be approximated using a look-up table (LUT). The parameters $\alpha$ and $\beta$ are then used to compute the predicted chroma values 1106 from the filtered, down sampled luma block 1102 as per Eq. 1.

Although not specifically shown, the parameter $\alpha$ may be normalized to reduce the precision of the parameter prior to computing the predicted chroma values. The normalization may be performed, for example, by counting the leading number of zeroes (for positive numbers) or ones (for negative numbers) and shifting by the count to normalize the value. In one embodiment, the value of $\alpha$ is normalized as per the following equation:

$$a = a3 \gg \text{Max}(0, \text{Log } 2(\text{abs}(a3))-6)$$

where a3 is the original value of $\alpha$ and a is the value of $\alpha$ after normalization. The above equation may be implemented as per the following pseudo code:

Short $n$=CountLeadingZerosOnes($a$);

$a = a \gg (9-n)$;

Note that the above equation and pseudo code reduce the precision of $\alpha$ to 7 bits. Other normalization of $\alpha$ may also be used to reduce the precision of $\alpha$ to, for example, 6 bits or 8 bits.

Figure 12:
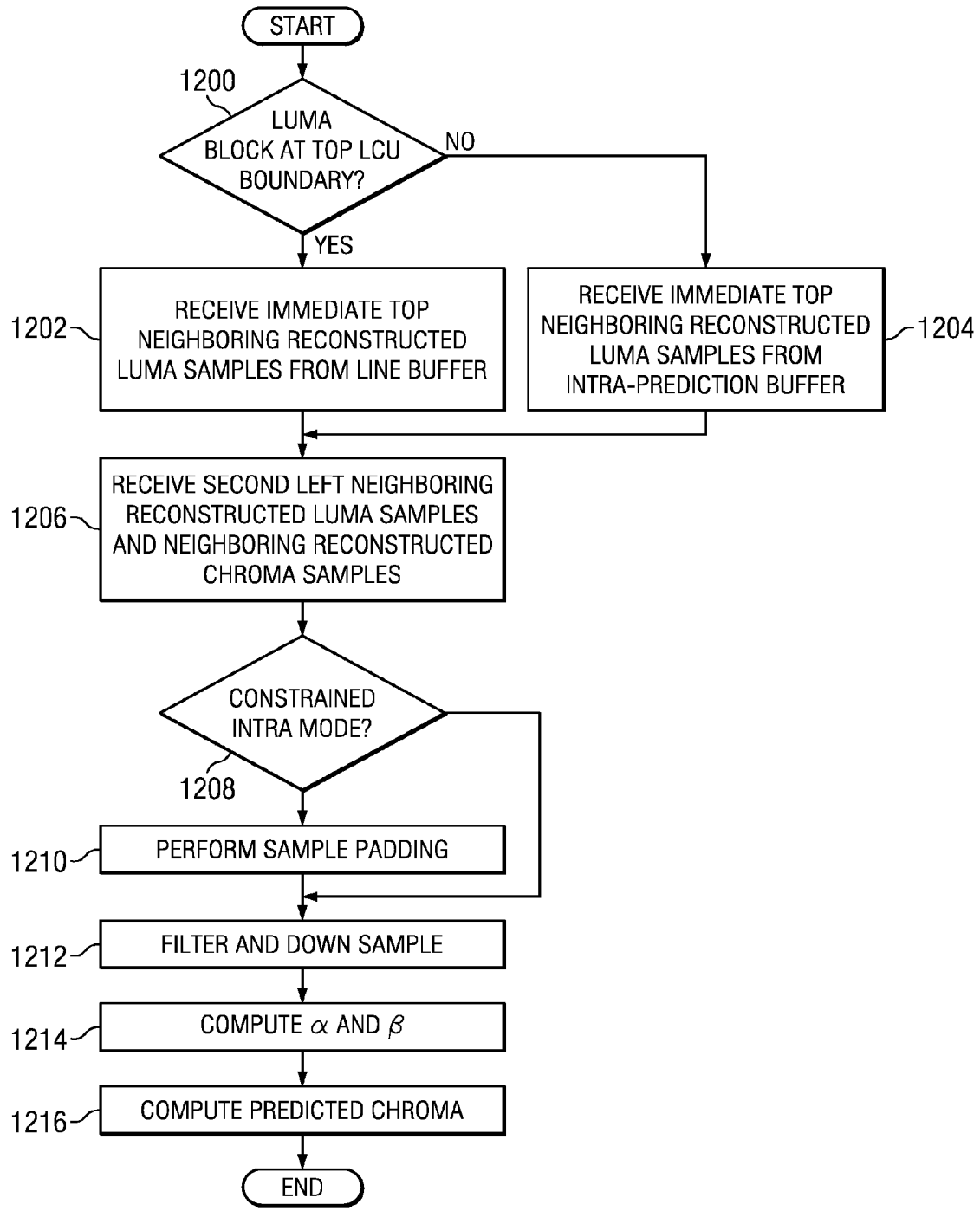

FIG. 12 shows a method for LM mode intra-prediction of a chroma block of a PU from a corresponding reconstructed luma block in which only immediate top neighboring reconstructed luma samples and second left neighboring reconstructed luma samples are used. This method may be used in an encoder or a decoder. Initially, a check 1200 is made to determine if the luma block is at the top boundary of the LCU. If the luma block is at the top boundary, the immediate top neighboring reconstructed luma samples are received 1202 from a top neighboring sample line buffer storing the last row of reconstructed samples from the previous LCU row. If the luma block is not at the top boundary, the immediate top neighboring reconstructed luma samples are received 1204 from an intra-prediction buffer storing reconstructed LCUs for use in intra-prediction. The second left neighboring reconstructed luma samples and the top and left neighboring reconstructed chroma samples are also received 1206 from the intra-prediction buffer.

If constrained intra-prediction mode is enabled 1208, sample padding 1210 is performed on the immediate top neighboring reconstructed luma samples, the second left neighboring reconstructed luma samples, and the neighboring reconstructed chroma samples to replace any samples from inter-predicted PUs with values better suited for intra-prediction. The sample padding used is defined by the video coding standard in use.

The immediate top neighboring reconstructed luma samples and second left neighboring reconstructed luma samples are filtered and down sampled 1212 to reduce the sampling rate of the luma samples to that of the chroma samples. Down sampling of immediate top neighboring reconstructed luma samples is previously described herein. Any suitable filters may be used and the filters for top neighboring samples and left neighboring samples may be different, e.g., [0.5, 0.5], [0.25, 0.5, 0.25] etc. In some embodiments, the neighboring reconstructed chroma samples are also filtered. In such embodiments, different filters may be used for chroma and luma samples.

The parameters $\alpha$ and $\beta$ are then computed 1214 by linear regression using the filtered, down sampled immediate top neighboring reconstructed luma samples and second left neighboring reconstructed luma samples and the neighboring reconstructed chroma samples. Any suitable technique for linear regression may be used. In some embodiments, the ordinary least squares technique of Eq. 3 and 4 is used. The two parameters are then used to compute 1216 the predicted chroma block from the corresponding down sampled reconstructed luma block as per Eq. 1. In some embodiments, the parameter $\alpha$ is normalized prior to computing the predicted chroma block. Normalization of the parameter $\alpha$ is previously described herein.

Figure 13:
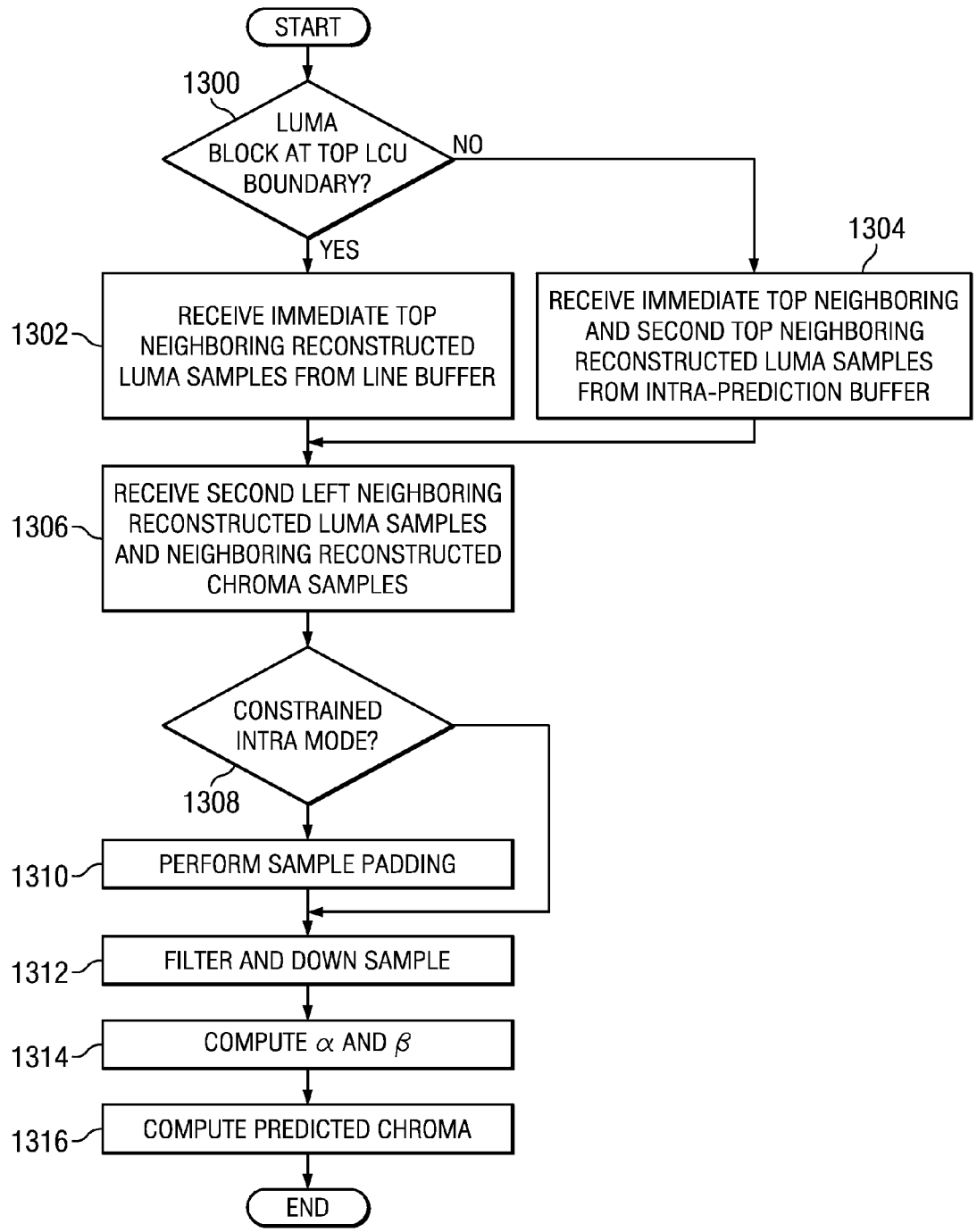

FIG. 13 shows a method for LM mode intra-prediction of a chroma block of a PU from a corresponding reconstructed luma block. This method may be used in an encoder or a decoder. Initially, a check 1300 is made to determine if the luma block is at the top boundary of the LCU. If the luma block is at the top boundary, the immediate top neighboring reconstructed luma samples are received 1302 from a top neighboring sample line buffer storing the last row of reconstructed samples from the previous LCU row. The second left neighboring reconstructed luma samples and the top and left neighboring reconstructed chroma samples are also received 1306 from the intra-prediction buffer.

If constrained intra-prediction mode is enabled 1308, sample padding 1310 is performed on the immediate top neighboring reconstructed luma samples, the second left neighboring reconstructed luma samples, and the neighboring reconstructed chroma samples to replace any samples from inter-predicted PUs with values better suited for intra-prediction. The sample padding used is defined by the video coding standard in use.

The immediate top neighboring reconstructed luma samples and second left neighboring reconstructed luma samples are filtered and down sampled 1312 to reduce the sampling rate of the luma samples to that of the chroma samples. Down sampling of immediate top neighboring reconstructed luma samples is previously described herein. Any suitable filters may be used and the filters for top neighboring samples and left neighboring samples may be different, e.g., [0.5, 0.5], [0.25, 0.5, 0.25] etc. In some embodiments, the neighboring reconstructed chroma samples are also filtered. In such embodiments, different filters may be used for chroma and luma samples.

The parameters $\alpha$ and $\beta$ are then computed 1314 by linear regression using the filtered, down sampled immediate top neighboring reconstructed luma samples and second left neighboring reconstructed luma samples and the neighboring reconstructed chroma samples. Any suitable technique for linear regression may be used. In some embodiments, the ordinary least squares technique of Eq. 3 and 4 is used. The two parameters are then used to compute 1316 the predicted chroma block from the corresponding down sampled reconstructed luma block as per Eq. 1. In some embodiments, the parameter $\alpha$ is normalized prior to computing the predicted chroma block. Normalization of the parameter $\alpha$ is previously described herein.

If the luma block is not at the top boundary, the immediate top neighboring reconstructed luma samples and the second top neighboring reconstructed luma samples are received 1304 from an intra-prediction buffer storing reconstructed LCUs for use in intra-prediction. The second left neighboring reconstructed luma samples and the top and left neighboring reconstructed chroma samples are also received 1306 from the intra-prediction buffer.

If constrained intra-prediction mode is enabled 1308, sample padding 1310 is performed on the immediate top neighboring reconstructed luma samples, the second top neighboring reconstructed luma samples, the second left neighboring reconstructed luma samples, and the neighboring reconstructed chroma samples to replace any samples from inter-predicted PUs with values better suited for intra-prediction. The sample padding used is defined by the video coding standard in use.

The immediate top neighboring reconstructed luma samples, the second top neighboring reconstructed luma samples and second left neighboring reconstructed luma samples are filtered and down sampled 1312 to reduce the sampling rate of the luma samples to that of the chroma samples. Down sampling of immediate top neighboring reconstructed luma samples and second top neighboring reconstructed luma samples is previously described herein. Any suitable filters may be used and the filters for top neighboring samples and left neighboring samples may be different, e.g., [0.5, 0.5], [0.25, 0.5, 0.25] etc. In some embodiments, the neighboring reconstructed chroma samples are also filtered. In such embodiments, different filters may be used for chroma and luma samples.

The parameters α and β are then computed 1314 by linear regression using the filtered, down sampled immediate top neighboring and second top neighboring reconstructed luma samples and second left neighboring reconstructed luma samples and the neighboring reconstructed chroma samples. Any suitable technique for linear regression may be used. In some embodiments, the ordinary least squares technique of Eq. 3 and 4 is used. The two parameters are then used to compute 1316 the predicted chroma block from the corresponding down sampled reconstructed luma block as per Eq. 1.

In some embodiments, the parameter α is normalized prior to computing the predicted chroma block. Normalization of the parameter α is previously described herein.

In the prior art, both immediate top neighboring reconstructed luma samples and second top neighboring reconstructed luma samples is used for all LM mode intra-prediction because a 4.2.0 sampling rate is used. When the luma samples are down sampled, the two rows of neighboring reconstructed luma samples correspond to one row of chroma samples, which provides somewhat better compression performance than using just the immediate top neighboring reconstructed luma samples. However, simulations performed on multiple classes of test video sequences using just the immediate top neighboring reconstructed luma samples along with second left neighboring reconstructed luma samples for LM mode intra-prediction during encoding showed that there is a nominal bit rate increase over the prior art.

The simulation results are summarized in Table 1. This table shows the increase in bit rate for Y, U, and V over the prior art for five classes of test video sequences for two different test conditions, Intra and Intra LC. Under the Intra test conditions, all frames are encoded using intra-predicted pictures only and with a goal of achieving higher compression performance. Under Intra LC test conditions, all frames are encoded using intra-predicted pictures only with a goal of low delay in throughput. BD-Rate stands for Bjontegaard delta bit rate, which is described in G. Bjontegaard, "Calculation of Average PSNR Differences Between RD-Curves, Doc. VCEG-M33, ITU-T SC16/Q6, 13$^{th}$ VCEG Meeting, Austin, Tex., April 2001. The Class A video sequences are 2560×1600 sequences, the Class B video sequences are 1080p sequences, the Class C video sequences are WVGA (Wide Video Graphics Array) sequences, the Class D video sequences are WQVGA (Wide Quarter Video Graphics Array) sequences, and the Class E video sequences are 720p sequences. Positive numbers indicate an increase in bit rate.

As can be seen from this table, on average there is about 0.2% bit rate increase for U and V over the prior art. This nominal increase may be acceptable in many codec applications in exchange for eliminating the need to store two picture-wide rows of reconstructed luma samples.

TABLE 1

|  | Intra | | | Intra LC | | |
| --- | --- | --- | --- | --- | --- | --- |
|  | Y BD-rate | U BD-rate | V BD-rate | Y BD-rate | U BD-rate | V BD-rate |
| Class A | 0.0 | 0.6 | 0.7 | 0.0 | 0.7 | 0.6 |
| Class B | 0.0 | 0.1 | 0.1 | 0.0 | 0.1 | 0.0 |
| Class C | 0.0 | 0.2 | 0.2 | 0.0 | 0.1 | 0.2 |
| Class D | 0.0 | 0.1 | 0.1 | 0.0 | 0.1 | 0.1 |
| Class E | 0.0 | 0.0 | 0.1 | 0.0 | 0.0 | 0.0 |
| All | 0.0 | 0.2 | 0.2 | 0.0 | 0.2 | 0.2 |
| Enc Time[%] |  | 97% |  |  | 99% |  |
| Dec Time[%] |  | 96% |  |  | 98% |  |

Figure 14:
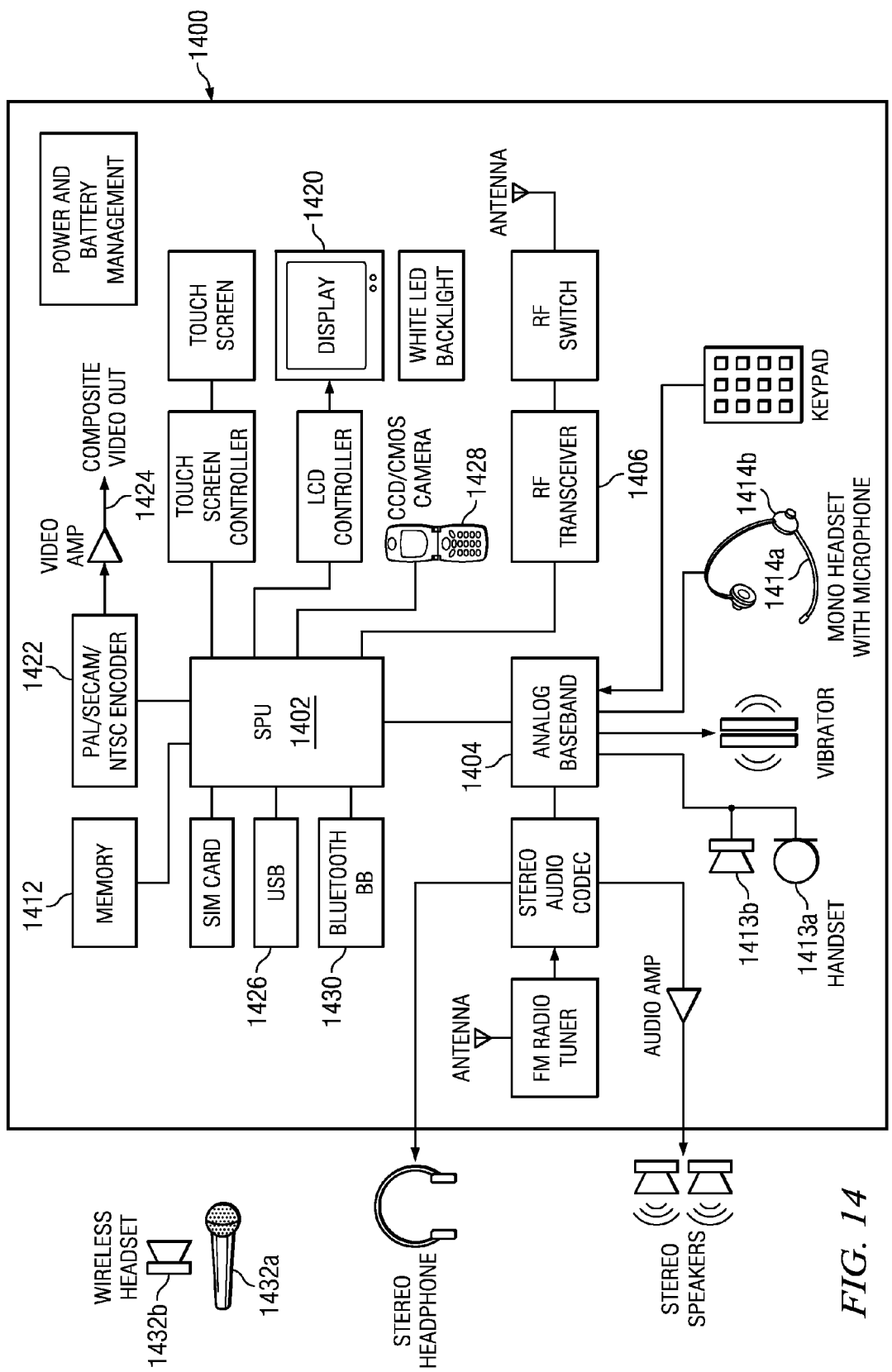
FIG. 14 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, a set top box, a digital video recorder, etc.). FIG. 14 is a block diagram of a digital system 1400 (e.g., a mobile cellular telephone) that may be configured to use techniques described herein.

As shown in FIG. 14, the signal processing unit (SPU) 1402 includes a digital signal processing system (DSP) that includes embedded memory and security features. The analog baseband unit 1404 receives a voice data stream from the handset microphone 1413a and sends a voice data stream to the handset mono speaker 1413b. The analog baseband unit 1404 also receives a voice data stream from the microphone 1414a or 1432a and sends a voice data stream to the mono headset 1414b or wireless headset 1432b. The analog baseband unit 1404 and the SPU 1402 may be separate ICs. In many embodiments, the analog baseband unit 1404 does not embed a programmable processor core, but performs processing based on configuration of audio paths, filters, gains, etc being setup by software running on the SPU 1402.

The display 1420 may display pictures and video sequences received from a local camera 1428, or from other sources such as the USB 1426 or the memory 1412. The SPU 1402 may also send a video sequence to the display 1420 that is received from various sources such as the cellular network via the RF transceiver 1406 or the Bluetooth interface 1430. The SPU 1402 may also send a video sequence to an external video display unit via the encoder unit 1422 over a composite output terminal 1424. The encoder unit 1422 may provide encoding according to PAL/SECAM/NTSC video standards.

The SPU 1402 includes functionality to perform the computational operations required for video encoding and decoding. In one or more embodiments, the SPU 1402 is configured to perform computational operations for applying one or more techniques for luma-based chroma intra-prediction during the encoding process as described herein. Software instructions implementing all or part of the techniques may be stored in the memory 1412 and executed by the SPU 1402, for example, as part of encoding video sequences captured by the local camera 1428. The SPU 1402 is also configured to perform computational operations for applying one or more techniques for luma-based chroma intra-prediction as described herein as part of decoding a received coded video sequence or decoding a coded video sequence stored in the memory 1412. Software instructions implementing all or part of the techniques may be stored in the memory 1412 and executed by the SPU 1402.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, previously described embodiments assumed a 4:2:0 sampling rate. Other sampling rates may also be used, such as 4:2:2 and 4:4:4, as long as the number of neighboring samples I is a power of 2. For a 4:4:4 sampling rate, the initial down sampling of the luma block and the neighboring luma samples to the chroma sampling rate is not needed. For a 4:2:2 sampling rate, the initial down sampling of the luma block and the neighboring luma samples could be different in the horizontal and vertical directions. For example, for a 16×16 luma block, the chroma block would be 16×8 and the luma block would need to be down sampled differently in the horizontal and vertical directions.

In another example, although embodiments herein are described in which the left neighboring reconstructed luma samples are taken from the second column of reconstructed luma samples to the left of the reconstructed luma block, other left neighboring reconstructed luma samples may be used, such as the immediate left neighboring reconstructed luma samples, i.e., those in the first column of reconstructed samples to the left of the reconstructed luma block. In such embodiments, the down sampling of the immediate left neighboring reconstructed luma samples prior to computation of the parameters α and β can be performed in a similar fashion to the down sampling of the immediate top neighboring reconstructed luma samples.

In another example, if a 4:4:4 sampling rate is used, the immediate left immediate left neighboring reconstructed luma samples and the immediate top neighboring reconstructed luma samples may be used for all LM mode intra-prediction since the sampling rates of the luma and the chroma are the same. In such embodiments, the luma block and the neighboring reconstructed luma samples are not down sampled unless the neighboring reconstructed chroma samples and the chroma block are identically down sampled.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for luma-based chroma intra-prediction in a video encoder or a video decoder, the method comprising:
    receiving immediate top neighboring reconstructed luma samples of a first reconstructed luma block of a largest coding unit (LCU), at least some of the immediate top neighboring reconstructed luma samples being neighboring reconstructed luma samples from one or more inter-predicted prediction units (PUs);
    replacing the neighboring reconstructed luma samples from the inter-predicted PUs with other samples without replacing second top neighboring reconstructed luma samples to generate padded immediate top neighboring reconstructed luma samples;
    down sampling the padded immediate top neighboring reconstructed luma samples;
    computing parameters α and β of a linear model using the down sampled padded immediate top neighboring reconstructed luma samples and left neighboring reconstructed luma samples of the first reconstructed luma block and reconstructed neighboring chroma samples of a chroma block corresponding to the first reconstructed luma block, and without using the second top neighboring reconstructed luma samples, wherein the linear model is $Pred_C[x,y]=\alpha \cdot Rec_L'[x,y]+\beta$, wherein x and y are sample coordinates, $Pred_C$ is predicted chroma samples, and $Rec_L'$ is samples of the down sampled first reconstructed luma block, and wherein the immediate top neighboring reconstructed luma samples are the only top neighboring reconstructed luma samples used; and
    computing samples of a first predicted chroma block from corresponding samples of the first reconstructed luma block using the linear model and the parameters.

2. The method of claim 1, wherein the first reconstructed luma block is at a top border of the LCU.

3. The method of claim 2, wherein the immediate top neighboring reconstructed luma samples are received from a top neighboring sample line buffer comprising a last row of reconstructed luma samples from each LCU of a row of LCUs immediately above the LCU.

4. The method of claim 1, wherein the first reconstructed luma block is not at a top border of the LCU.

5. The method of claim 1, wherein the left neighboring reconstructed luma samples are immediately left of immediately left neighboring reconstructed luma samples of the first reconstructed luma block.

6. The method of claim 2, further comprising:
down sampling a second reconstructed luma block of the LCU, wherein the second reconstructed luma block is not at the top border of the LCU;
computing parameters α and β of the linear model using immediate top neighboring reconstructed luma samples, top neighboring reconstructed luma samples immediately above the immediate top neighboring reconstructed luma samples, and left neighboring reconstructed luma samples of the second reconstructed luma block and reconstructed neighboring chroma samples of a chroma block corresponding to the second reconstructed luma block; and
computing samples of a second predicted chroma block from corresponding samples of the down sampled second reconstructed luma block using the linear model and the parameters.

7. A digital system configured to perform luma-based chroma intra-prediction, the digital system comprising:
a memory for storing instructions related to luma-based chroma intra-prediction;
a processor for executing the instructions stored in the memory, wherein the processor is configured to:
receive immediate top neighboring reconstructed luma samples of a first reconstructed luma block of a largest coding unit (LCU), at least some of the immediate top neighboring reconstructed luma samples being neighboring reconstructed luma samples from one or more inter-predicted prediction units (PUs);
replace the neighboring reconstructed luma samples from the inter-predicted PUs with other samples without replacing second top neighboring reconstructed luma samples to generate padded immediate top neighboring reconstructed luma samples;
down sample the padded immediate top neighboring reconstructed luma samples;
compute parameters α and β of a linear model using the down sampled padded immediate top neighboring reconstructed luma samples and left neighboring reconstructed luma samples of the first reconstructed luma block and reconstructed neighboring chroma samples of a chroma block corresponding to the first reconstructed luma block, wherein the linear model is $Pred_C[x,y]=\alpha \cdot Rec_L'[x,y]+\beta$, wherein x and y are sample coordinates, $Pred_C$ is predicted chroma samples, and $Rec_L'$ is samples of the down sampled first reconstructed luma block, and wherein the immediate top neighboring reconstructed luma samples are the only top neighboring reconstructed luma samples used; and
computing samples of a first predicted chroma block from corresponding samples of the first reconstructed luma block using the linear model and the parameters.

8. The digital system of claim 7, wherein the first reconstructed luma block is at a top border of the LCU.

9. The digital system of claim 7, wherein the first reconstructed luma block is not at a top border of the LCU.

10. The digital system of claim 7, wherein the left neighboring reconstructed luma samples are immediately left of immediately left neighboring reconstructed luma samples of the first reconstructed luma block.

11. The digital system of claim 8, wherein the processor is further configured to:
down sample a second reconstructed luma block of the LCU, wherein the second reconstructed luma block is not at the top border of the LCU;
compute parameters α and β of the linear model using immediate top neighboring reconstructed luma samples, top neighboring reconstructed luma samples immediately above the immediate top neighboring reconstructed luma samples, and left neighboring reconstructed luma samples of the second reconstructed luma block and reconstructed neighboring chroma samples of a chroma block corresponding to the second reconstructed luma block; and
compute samples of a second predicted chroma block from corresponding samples of the down sampled second reconstructed luma block using the linear model and the parameters.

12. The digital system of claim 8, wherein the processor is further configured to:
store a last row of reconstructed luma samples from each LCU of a row of LCUs.

13. A non-transitory computer readable medium comprising instructions that, when executed in a digital system, cause the digital system to:
receive immediate top neighboring reconstructed luma samples of a first reconstructed luma block of a largest coding unit (LCU), at least some of the immediate top neighboring reconstructed luma samples being neighboring reconstructed luma samples from one or more inter-predicted prediction units (PUs);
replace the neighboring reconstructed luma samples from the inter-predicted PUs with other samples without replacing second top neighboring reconstructed luma samples to generate padded immediate top neighboring reconstructed luma samples;
down sample the padded immediate top neighboring reconstructed luma samples;
compute parameters α and β of a linear model using the down sampled padded immediate top neighboring reconstructed luma samples and left neighboring reconstructed luma samples of the first reconstructed luma block and reconstructed neighboring chroma samples of a chroma block corresponding to the first reconstructed luma block, wherein the linear model is $Pred_C[x,y]=\alpha \cdot Rec_L'[x,y]+\beta$, wherein x and y are sample coordinates, $Pred_C$ is predicted chroma samples, and $Rec_L'$ is samples of the down sampled first reconstructed luma block, and wherein the immediate top neighboring reconstructed luma samples are the only top neighboring reconstructed luma samples used; and
compute samples of a first predicted chroma block from corresponding samples of the first reconstructed luma block using the linear model and the parameters.

14. The computer readable medium of claim 13, wherein the first reconstructed luma block is at a top border of the LCU.

15. The computer readable medium of claim 14, wherein the immediate top neighboring reconstructed luma samples are received from a top neighboring sample line buffer comprising a last row of reconstructed luma samples from each LCU of a row of LCUs immediately above the LCU.

16. The computer readable medium of claim 13, wherein the first reconstructed luma block is not at a top border of the LCU.

17. The computer readable medium of claim 13, wherein the left neighboring reconstructed luma samples are immediately left of immediately left neighboring reconstructed luma samples of the first reconstructed luma block.

18. The computer readable medium of claim 14, wherein the instructions further cause the digital system to:

down sample a second reconstructed luma block of the LCU, wherein the second reconstructed luma block is not at the top border of the LCU;

compute parameters $\alpha$ and $\beta$ of the linear model using immediate top neighboring reconstructed luma samples, top neighboring reconstructed luma samples immediately above the immediate top neighboring reconstructed luma samples, and left neighboring reconstructed luma samples of the second reconstructed luma block and reconstructed neighboring chroma samples of a chroma block corresponding to the second reconstructed luma block; and compute samples of a second predicted chroma block from corresponding samples of the down sampled second reconstructed luma block using the linear model and the parameters.

* * * * *